(12) United States Patent
Jeong et al.

(10) Patent No.: US 9,684,633 B2
(45) Date of Patent: Jun. 20, 2017

(54) ADAPTIVE SERVICE CONTROLLER, SYSTEM ON CHIP AND METHOD OF CONTROLLING THE SAME

(71) Applicant: SAMSUNG ELECTRONICS CO., LTD., Suwon-si, Gyeonggi-do (KR)

(72) Inventors: Bub-Chul Jeong, Yongin-si (KR); Jun-Hee Yoo, Ansan-si (KR); Sung-Hyun Lee, Gwangju-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 246 days.

(21) Appl. No.: 13/799,785

(22) Filed: Mar. 13, 2013

(65) Prior Publication Data

US 2014/0208071 A1 Jul. 24, 2014

Related U.S. Application Data

(60) Provisional application No. 61/756,217, filed on Jan. 24, 2013.

(30) Foreign Application Priority Data

Feb. 25, 2013 (KR) .......................... 10-2013-0019646

(51) Int. Cl.
*G06F 12/00* (2006.01)
*G06F 13/14* (2006.01)
*G06F 13/38* (2006.01)
*G06F 15/80* (2006.01)
*G06F 15/78* (2006.01)

(52) U.S. Cl.
CPC .......... *G06F 15/80* (2013.01); *G06F 15/7807* (2013.01)

(58) Field of Classification Search
CPC ............ G06F 13/1605; G06F 11/0793; G06F 3/0619; G06F 11/0772; G06F 11/0751; G06F 11/076; G06F 11/079; H04L 63/1425; H04L 63/1458
USPC .................................................. 710/240–244
See application file for complete search history.

(56) References Cited

U.S. PATENT DOCUMENTS

| 4,787,041 | A | * | 11/1988 | Yount ...................... G05B 9/03 700/2 |
| 5,761,516 | A | * | 6/1998 | Rostoker et al. ............. 710/260 |
| 5,796,961 | A | | 8/1998 | O'Brien |
| 5,862,353 | A | * | 1/1999 | Revilla et al. ................ 710/107 |
| 6,826,644 | B1 | * | 11/2004 | Arramreddy et al. ........ 710/244 |

(Continued)

FOREIGN PATENT DOCUMENTS

| JP | 08-263429 | 11/1996 |
| JP | 2003-114870 | 4/2003 |

(Continued)

*Primary Examiner* — Faisal M Zaman
(74) *Attorney, Agent, or Firm* — F. Chau & Associates, LLC

(57) ABSTRACT

A system on chip (SOC) includes a slave device, a plurality of master devices, an interconnect device and a plurality of service controllers. The master devices generate requests to demand services from the slave device. The interconnect device is coupled to the slave device and the master devices through respective channels, and the interconnect device performs an arbitrating operation on the requests. The service controllers control request flows from the master devices adaptively depending on an operational environment change of the SOC.

23 Claims, 18 Drawing Sheets

(56) References Cited

U.S. PATENT DOCUMENTS

| | | | |
|---|---|---|---|
| 7,062,582 B1* | 6/2006 | Chowdhuri | 710/116 |
| 7,194,561 B2 | 3/2007 | Weber | |
| 7,657,682 B2* | 2/2010 | Pagan | G06F 13/362 |
| | | | 370/230 |
| 8,549,199 B2 | 10/2013 | Mace | |
| 9,201,816 B2 | 12/2015 | Mace | |
| 2003/0074507 A1 | 4/2003 | Weber | |
| 2003/0177296 A1* | 9/2003 | Kurth | 710/244 |
| 2003/0191907 A1 | 10/2003 | Weber | |
| 2004/0019749 A1 | 1/2004 | Mochida et al. | |
| 2004/0073730 A1* | 4/2004 | Horii et al. | 710/113 |
| 2004/0194095 A1 | 9/2004 | Lumb et al. | |
| 2005/0086404 A1 | 4/2005 | Weber | |
| 2005/0096970 A1 | 5/2005 | Weber | |
| 2005/0204085 A1* | 9/2005 | Fukuyama et al. | 710/244 |
| 2005/0281253 A1* | 12/2005 | Veijalainen et al. | 370/363 |
| 2006/0059284 A1* | 3/2006 | Saen et al. | 710/117 |
| 2006/0137377 A1* | 6/2006 | Samson | G06F 1/206 |
| | | | 62/259.2 |
| 2007/0038792 A1 | 2/2007 | Shin | |
| 2007/0174530 A1* | 7/2007 | Genova | G06F 13/4031 |
| | | | 710/241 |
| 2007/0223528 A1 | 9/2007 | Karmi et al. | |
| 2008/0034141 A1 | 2/2008 | Furuzono | |
| 2008/0098145 A1* | 4/2008 | Yeh | G06F 13/1626 |
| | | | 710/244 |
| 2008/0112313 A1* | 5/2008 | Terakawa | 370/229 |
| 2008/0147944 A1 | 6/2008 | Sonntag et al. | |
| 2008/0209093 A1* | 8/2008 | Huang et al. | 710/107 |
| 2008/0215782 A1* | 9/2008 | Mochida | G06F 13/1605 |
| | | | 710/117 |
| 2008/0228959 A1* | 9/2008 | Wang | 710/22 |
| 2009/0235123 A1* | 9/2009 | Oshida | G06F 11/0793 |
| | | | 714/43 |
| 2009/0248976 A1 | 10/2009 | Rotithor | |
| 2010/0115167 A1* | 5/2010 | Tardieux | G06F 13/362 |
| | | | 710/240 |
| 2011/0138092 A1* | 6/2011 | Morimoto | G06F 12/00 |
| | | | 710/244 |
| 2012/0117288 A1* | 5/2012 | Katogi | 710/114 |
| 2012/0124260 A1* | 5/2012 | Kothamasu | G06F 13/4022 |
| | | | 710/110 |
| 2012/0209936 A1* | 8/2012 | Chen | G06F 1/266 |
| | | | 709/208 |
| 2012/0221754 A1* | 8/2012 | Hong | G06F 13/00 |
| | | | 710/108 |
| 2013/0074087 A1* | 3/2013 | Chambliss | G06F 9/4881 |
| | | | 718/103 |
| 2013/0246727 A1* | 9/2013 | Hikono | G06F 13/1605 |
| | | | 711/163 |
| 2014/0122790 A1* | 5/2014 | Lasserre | G11C 11/40611 |
| | | | 711/106 |

FOREIGN PATENT DOCUMENTS

| | | |
|---|---|---|
| JP | 2004-355435 | 12/2004 |
| JP | 2006-133948 | 5/2006 |
| JP | 2007-207024 | 8/2007 |
| JP | 2007-304830 | 11/2007 |
| JP | 2011-065649 | 3/2011 |

* cited by examiner

| SCENARIO | OVERFLOW VALUE(OV) | GRANT VALUE(GRN) | DECREMENT VALUE(DEC) | STEAL |
|---|---|---|---|---|
| CASE1 (DEFAULT) | PROCESSOR:25 MODEM:1000 DISPLAY:100 | PROCESSOR:15 MODEM:1 DISPLAY:5 | PROCESSOR:1 MODEM:1 DISPLAY:1 | NONE |
| CASE2 | PROCESSOR:33 MODEM:1000 DISPLAY:50 | LEAVE AS DEFAULT | LEAVE AS DEFAULT | STEAL 5 FROM PROCESSOR |
| CASE3 | PROCESSOR:33 MODEM:1000 DISPLAY:50 | LEAVE AS DEFAULT | PROCESSOR:2 MODEM:2 DISPLAY:2 | STEAL 5 FROM PROCESSOR |
| CASE4 | PROCESSOR:100 MODEM:1000 DISPLAY:50 | LEAVE AS DEFAULT | PROCESSOR:2 MODEM:2 DISPLAY:1 | STEAL 5 FROM PROCESSOR |
| CASE5 | LEAVE AS DEFAULT | PROCESSOR:INF MODEM:1 DISPLAY:5 | LEAVE AS DEFAULT | STEAL 5 FROM PROCESSOR |

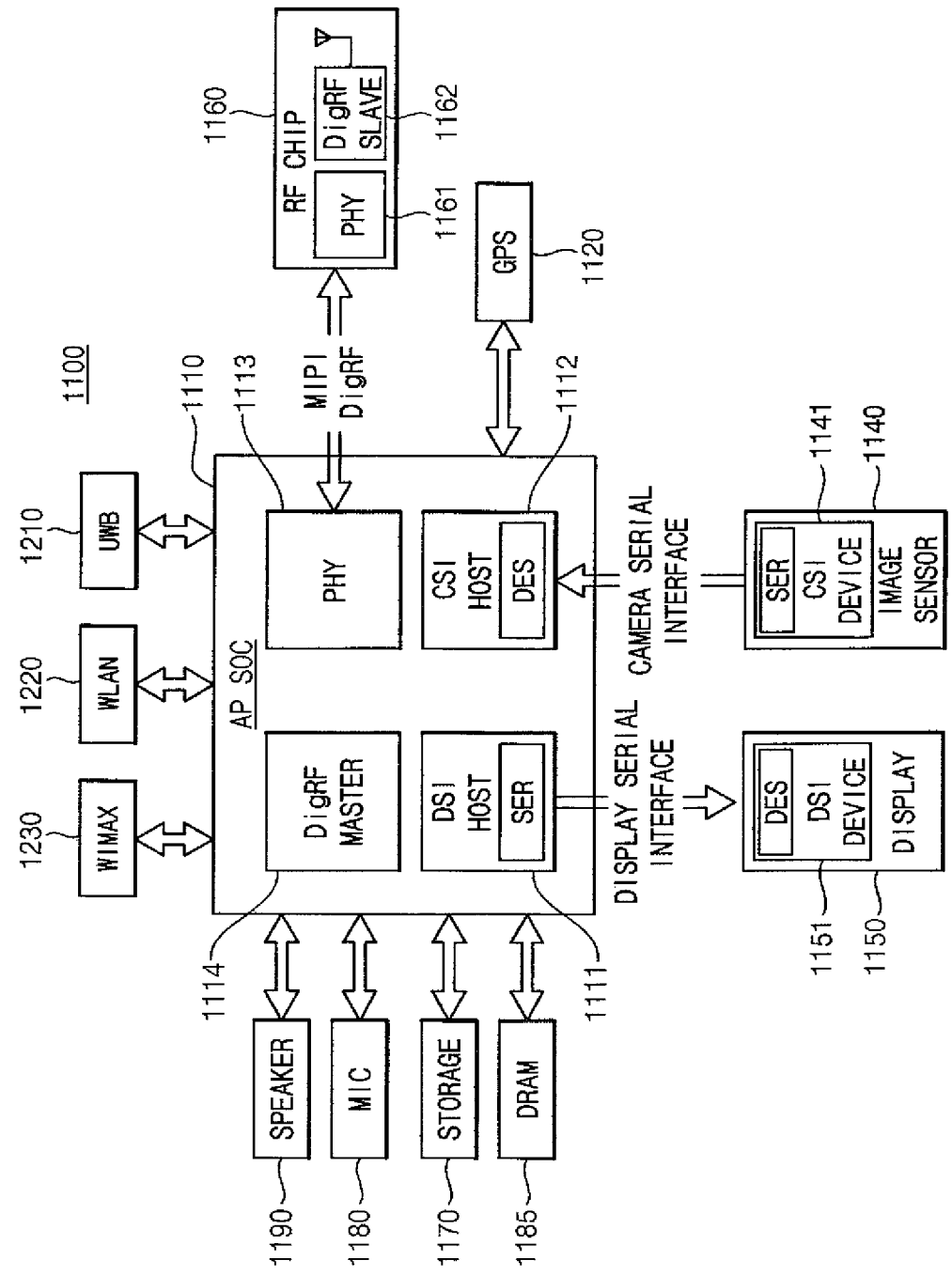

ADAPTIVE SERVICE CONTROLLER, SYSTEM ON CHIP AND METHOD OF CONTROLLING THE SAME

CROSS-REFERENCE TO RELATED APPLICATION

This U.S. Non-provisional application claims priority under 35 USC §119 to U.S. Provisional Application No. 61/756,217 filed on Jan. 24, 2013 in the USPTO, and Korean Patent Application No. 10-2013-0019646, filed on Feb. 25, 2013, in the Korean Intellectual Property Office (KIPO), the disclosure of which are incorporated by reference in their entirety herein.

BACKGROUND

1. Technical Field

Exemplary embodiments of the inventive concept relate generally to semiconductor integrated circuits and more particularly to an adaptive service controller, a system on chip (SOC) and a method of controlling the SOC for enhancing quality of service (QOS).

2. Discussion of Related Art

An SOC indicates a chip or a system on the chip in which various semiconductor components are integrated as one chip. The recent market trend is away from application specific integrated circuits (ASICs) and application specific standard products (ASSPs), toward SOC technologies. Further, there is an increasing demand for reducing the size and increasing the performance level of the SOC. While the integration degree of the SOC may be increased by integrating additional components into one chip, an operational speed of the SOC may not increase sufficiently.

SUMMARY

At least one exemplary embodiment of the inventive concept provides a service controller and a system on chip (SOC) including the service controller, capable of controlling request flows adaptively depending on change of an operational environment change of the SOC.

At least one exemplary embodiment of the inventive concept provides a method of controlling an SOC, capable of controlling request flows adaptively depending on an operational environment change of the SOC.

According to an exemplary embodiment of the inventive concept, a system on chip (SOC) includes a slave device (e.g., or several slave devices), a plurality of master devices, an interconnect device and a plurality of service controllers. The master devices generate requests to demand services from the slave device. The interconnect device is coupled to the slave device and the master devices through respective channels, and the interconnect device performs an arbitrating operation on the requests. The service controllers control request flows from the master devices adaptively depending on an operational environment change of the SOC.

The SOC may further include a global controller configured to generate a global control signal based on at least one state signal, where the global control signal indicates the operational environment change. The service controllers may control the request flows based on the global signal.

The slave device may include a memory controller and the master devices may include a modem and a display controller. The state signal may include at least one of a first state signal that is activated when an operational temperature of the memory controller becomes greater than a threshold temperature, a second state signal that is activated when the modem is not serviced by the slave device for a threshold time, and a third state signal that is activated when a data buffer rate of the display controller is lower than a threshold rate.

Each of the service controllers may include a monitor configured to generate a credit value by detecting a service requirement level of the corresponding master device in realtime, and a control block configured to generate a local control signal to control the monitor based on the operational environment change and configured to generate a priority information signal for the request from the corresponding master device based on the credit value.

The local control signal may include an overflow value, a unit increment value and a unit decrement value. The monitor may include a first counter configured to generate a first event signal that is activated with a period corresponding to the overflow value, a service detector configured to generate a second event signal based on channel signals transferred between the corresponding master device and the interconnect device, where the second event signal is activated when the corresponding master device is serviced by the slave device, and a second counter configured to increase the credit value by the unit increment value in response to each activation of the first event signal and configured to decrease the credit value by the unit decrement value in response to each activation of the second event signal.

The control block may change at least one of the overflow value, the unit increment value and the unit decrement value based on the operational environment change to control the request flow from the corresponding master device.

The control block may promote the request flow of the corresponding master device by decreasing the overflow value, increasing the unit increment value or decreasing the unit decrement value, and demote the request flow from the corresponding master device by increasing the overflow value, decreasing the unit increment value or increasing the unit decrement value.

The local control signal may further include a steal value that is provided when the operational environment change occurs, and second counter may decrease the credit value by the steal value.

At least one of the service controllers may include a limiter configured to block the request flow from the corresponding master device in response to a limit signal from the control block.

The control block may activate the limit signal when the credit value is smaller than a grant value, and change the grant value based on the operational environment change to control the request flow from the corresponding master device.

The limiter may include a synchronizer configured to generate a synchronized limit signal based on the limit signal, a first logic gate configured to output a masked valid signal by performing a logic operation on the synchronized limit signal and a valid signal from the corresponding master device, and a second logic gate configured to output a masked ready signal by performing a logic operation on the synchronized limit signal and a ready signal from the interconnect device.

The control block may set a plurality of operation modes by dividing ranges of the credit value and change values of the local control signal based on the operation modes to control the request flow from the corresponding master device.

The operation modes may include a promotion mode corresponding to the credit value greater than an upper boundary value, a default mode corresponding to the credit value smaller than the upper boundary value and greater than a lower boundary value, and a demotion mode corresponding to the credit value smaller than the lower boundary value.

The control block may change the values of the local control signal based on the operation modes such that the corresponding master device is allowed to have a larger bandwidth in the promotion mode than the default mode and a larger bandwidth in the default mode than the demotion mode.

The slave device may include a request queue configured to store the requests transferred from the master devices via the interconnect device, and a scheduler configured to adjust a service order with respect to the stored requests based on priorities of the stored request.

The master devices may include at least one realtime master device, and the service controller corresponding to the realtime master device may generate an urgent signal indicating that the realtime master device requires an urgent service from the slave device.

The scheduler may increase the priority of the stored requests from the realtime master device based on the urgent signal.

The SOC may further include a transmission line that is point-to-point coupled between the slave device and the service controller corresponding to the realtime master device, and the urgent signal may be transferred via the signal line directly from the service controller corresponding to the realtime master device to the slave device.

The master devices may include at least one best effort master device, the slave device may generate an external limit signal based on the operational environment change, and the service controller corresponding to the best effort master device may block the request flow from the best effort master device in response to the external limit signal.

The slave device may activate the external limit signal when the number of the stored requests in the request queue is greater than a threshold number.

The master devices may further include at least one realtime master device, and the slave device may activate the external limit signal in response to an urgent signal indicating that the realtime master device requires an urgent service from the slave device.

The realtime master device may include a display controller and the best effort master device includes a processor.

The SOC may further include a transmission line that is point-to-point coupled between the slave device and the service controller corresponding to the best effort device, the external limit signal may be transferred via the signal line directly from the slave device to the service controller corresponding to the best effort master device.

According to an exemplary embodiment of the inventive concept, a method is provided to control a system on chip (SOC) including at least one slave device, a plurality of master devices configured to generate requests to demand services from the slave device, respectively, and an interconnect device coupled to the slave device and the master devices through respective channels. The method includes generating at least one state signal indicating an operational state of at least one of the slave device and the master devices, generating a global control signal based on the state signal, the global control signal indicating an operational environment change of the SOC, and controlling request flows from the master devices adaptively depending on the global control signal.

According to an exemplary embodiment of the inventive concept, a service controller is provided to control a request flow from a master device to a slave device. The service controller includes a monitor configured to generate a credit value by detecting a service requirement level of the master device in realtime, and a control block configured to generate a local control signal to control the monitor based on an operational environment change and configured to generate a priority information signal for requests from the master device based on the credit value.

A system on chip (SOC) according to an exemplary of the inventive concept includes a slave device, first and second master devices configured to generate requests to demand services from the slave device, a sensor configured to detect whether an environmental condition of the SOC is in an abnormal state, a service controller configured to increase a priority of the request from one of the first and second master devices, and decrease a priority of the request from the other one of the first and second master devices when the abnormal state has been detected, and an interconnect device coupled to the slave device and the master devices through respective channels. The interconnect device is configured to perform an arbitrating operation on the requests based on the corresponding priorities.

In an exemplary embodiment, the environmental condition is a temperature of the slave device and the abnormal state indicates that the temperature exceeds a threshold temperature. In an exemplary embodiment, the environmental condition is latency of an exchange between the slave device and one of the master devices, and the abnormal state indicates the latency is greater than a threshold time. In an exemplary embodiment, the environmental condition is a data buffer rate of a data buffer in one of the master devices, and the abnormal state indicates the data buffer rate is lower than a threshold rate.

BRIEF DESCRIPTION OF THE DRAWINGS

Exemplary embodiments of the inventive concept will be more clearly understood from the following detailed description taken in conjunction with the accompanying drawings.

FIG. 14 is a diagram illustrating a method of controlling a system according to an exemplary embodiment of the inventive concept.

FIG. 25 is a block diagram illustrating an interface employable in the computing system of FIG. 24 according to an exemplary embodiment of the inventive concept.

DETAILED DESCRIPTION

Figure 1:
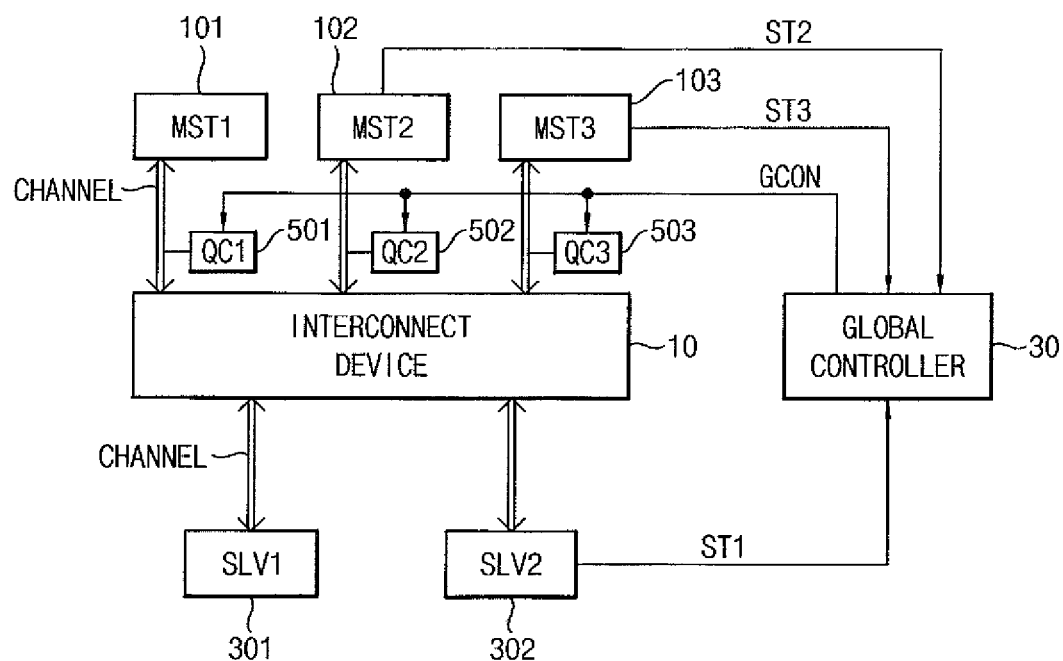
FIG. 1 is a block diagram illustrating a system according to an exemplary embodiment of the inventive concept.

The inventive concept will be described more fully hereinafter with reference to the accompanying drawings, in which some exemplary embodiments of the inventive concept are shown. The inventive concept may, however, be embodied in many different forms and should not be construed as limited to the exemplary embodiments set forth herein. In the drawings, the sizes and relative sizes of layers and regions may be exaggerated for clarity. Like numerals refer to like elements throughout.

As used herein, the singular forms "a," "an" and "the" are intended to include the plural forms as well, unless the context clearly indicates otherwise.

Figure 2:
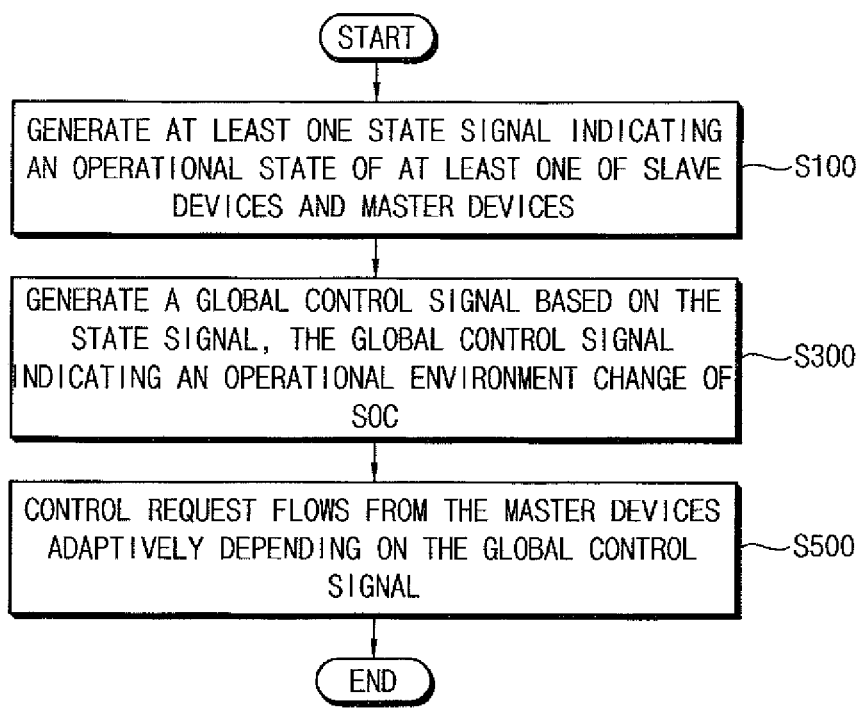
FIG. 2 is a flow chart illustrating a method of controlling a system according to an exemplary embodiment of the inventive concept.

It should also be noted that in some alternative implementations, the functions/acts noted in the blocks of a method may occur out of the order noted in the illustrated flowcharts (e.g., see FIG. 2). For example, two blocks shown in succession may in fact be executed substantially concurrently or the blocks may sometimes be executed in the reverse order, depending upon the functionality/acts involved.

FIG. 1 is a block diagram illustrating a system according to an exemplary embodiment of the inventive concept. The system may be a system on chip (SOC) in which various semiconductor components are integrated as one chip.

Referring to FIG. 1, a system 1000 includes master devices (MST1, MST2, MST3) 101, 102 and 103, slave devices (SLV1, SLV2) 301 and 302, an interconnect device 10 and service controllers (QC1, QC2, QC3) 501, 502 and 503. In some exemplary embodiments, the system 1000 may further include a global controller 30.

The master devices 101, 102 and 103 and the slave devices 301 and 302 may be referred to as an intellectual property (IP), respectively. In an exemplary embodiment, the master devices 101, 102 and 103 and/or slave devices 301 and 302 are reusable units of logic, cells, or a portion of a chip that contains the IP of one or more parties. The master devices and/or slave devices may also be referred to as IP cores or IP blocks. While FIG. 1 shows two slaves, three service controllers, and three masters, this is merely one example, as the inventive concept is not limited to any particular number of slaves, service controllers, or masters. For example, in an exemplary embodiment, only one slave device is present.

The master devices 101, 102 and 103 may generate requests to demand services from at least one of the slave devices 301 and 302, respectively. At least one of the slave devices 301 and 302 may be shared by the master devices 101, 102 and 103 as a common resource.

The slave devices 301 and 302 and the master devices 101, 102 and 103 are coupled to the interconnect device 10 through respective channels. One or more channels may be implemented between the interconnect device 10 and each of the master and slave devices 101, 102, 103, 301 and 302. For example, a read channel and a write channel may be implemented between the interconnect device 10 and one IP, respectively. The interconnect device 10 may perform an arbitrating operation on the requests from the master devices 101, 102 and 103. In an example of the arbitrating operation, when the interconnect device 10 receives two requests from two master devices for service by the same master device, the interconnect device determines which of the two requests should be carried out by the slave device. The interconnect device 10 may include at least one arbiter for performing the arbitrating operation.

The service controllers 501, 502 and 503 control request flows from the master devices 101, 102 and 103 adaptively depending on an operational environment change of the system 1000. The operational environment change may be referred to as an operational condition change or an operational state change. The SOC 1000 may include one or more sensors to determine whether an operational or environmental state of the SOC 1000 or a component therein (e.g., one of the slave devices) is in an abnormal state (e.g., is operating temperature, data buffer rate, latency, etc. operating outside of a pre-defined threshold range). In an example embodiment, the sensor(s) are located in the slave devices.

The operational environment change may be provided using one or more state signals. As an example, it is assumed that the second slave device 302 is a memory controller, the second master device 102 is a modem and the third master device 103 is a display controller.

The memory controller 302 may generate a first state signal ST1 that is activated when an operational temperature of the memory controller 302 becomes greater than a threshold temperature. The memory controller 302 may include a temperature sensor for detecting its operational temperature. The memory controller may be designed to reduce its operational speed when the operational temperature increases above the threshold temperature to ensure reliability of the operation of the memory controller. When the operational speed of the memory controller 302 is reduced, in one scenario, the number of requests that are received from the master devices for sharing the memory controller 302 as a common resource may be reduced, demoted, eliminated or blocked entirely, while ensuring a bandwidth requirement level of the realtime master device. In an exemplary embodiment, a request that is demoted has its priority reduced so that it can be fulfilled at a later time when the operational speed of the memory controller 302 has been restored to a normal level. For example, in an exemplary embodiment, some of the requests could have their priorities reduced, and then only those with priorities above a certain threshold would be fulfilled by the memory controller 302.

The modem 102 may generate a second state signal ST2 that is activated when the modem 102 had not been serviced by the slave device 302 for a threshold time. Due to a communication protocol with an external device, a generated or issued request may be invalidated if the modem 102 has not been serviced for the threshold time. For example, service by the slave device 302 could include sending data to the modem 102 from the slave device 302 in response to receipt of a request from the modem 102. When the service to the modem 102 from the memory controller 302 is seriously delayed due to the operational condition or environment change, in one scenario, the number of requests that are received from other master devices may be reduced, demoted, eliminated, or blocked to ensure the latency requirement level of the modem 102.

The display controller 103 may generate a third state signal ST3 that is activated when a data buffer rate of the display controller 103 becomes lower than a threshold rate. In an exemplary embodiment, the display controller 103 is a realtime IP that requires display data regularly. If the display data is serviced (e.g., sent) in time by the memory controller 302, a user may recognize it as poor performance of the product. When the data buffer rate is lower than the threshold rate, in one scenario, the number of requests that are received from other master devices may be reduced, demoted, eliminated or blocked to ensure the bandwidth requirement level of the display controller 103.

The above-mentioned scenarios may be determined variously considering the operational characteristics of the system 1000 and/or the selection of the user. Exemplary embodiments of the scenarios to control the request flows (e.g., flow of requests) based on the operational environment change are described below with reference to FIG. 14.

In an exemplary embodiment, as illustrated in FIG. 1, the system 1000 may further include the global controller 30 that is configured to generate a global control signal GCON based on at least one of the state signals ST1, ST2 and ST3. The global control signal indicates the operational environment change. The service controllers 501, 502 and 503 may be configured to control the respective request flows based on the global control signal GCON.

In an exemplary embodiment, the global controller 30 is omitted and the state signals ST1, ST2 and ST3 are provided directly to the service controllers 501, 502 and 503. In this embodiment, the service controllers 501, 502 and 503 may be configured to control the respective request flows based on each of the state signal ST1, ST2 and ST3 or a combination thereof.

The numbers of the master devices and the slave devices in FIG. 1 may be changed variously. The configurations of the service controllers 501, 502, and 503 may be the same or different from each other depending on the operational characteristics of the respective master devices 101, 102 and 103. Some of the service controllers 501, 502, 503 and 504 may be omitted.

FIG. 2 is a flow chart illustrating a method of controlling a system according to an exemplary embodiment of the inventive concept.

FIG. 2 illustrates a method of controlling a system that includes at least one slave device, a plurality of master devices and an interconnect device such that the slave device and the master devices are coupled to the interconnect device through respective channels and the master devices generate requests to demand services from the slave device, respectively, as illustrated in FIG. 1.

Referring to FIGS. 1 and 2, at least one of the slave devices 301 and 302 and the master devices 101, 102 and 103 generates at least one of the state signals ST1, ST2 and ST3 indicating an operational state of at least one of the slave devices 301 and 302 and the master devices 101, 102 and 103 (S100). The global controller 10 generates the global control signal GCON based on at least one of the state signals ST1, ST2 and ST3 (S300), such that the global control signal GCON may indicate an operational environment change of the SOC 1000. The service controllers 501, 502 and 503 control request flows from the master devices 101, 102 and 103 adaptively depending on the global control signal GCON (S500).

Hereinafter, various exemplary embodiments of the system of FIG. 1 and the method of FIG. 2 are described below with reference to FIGS. 3 through 23.

Figure 3:
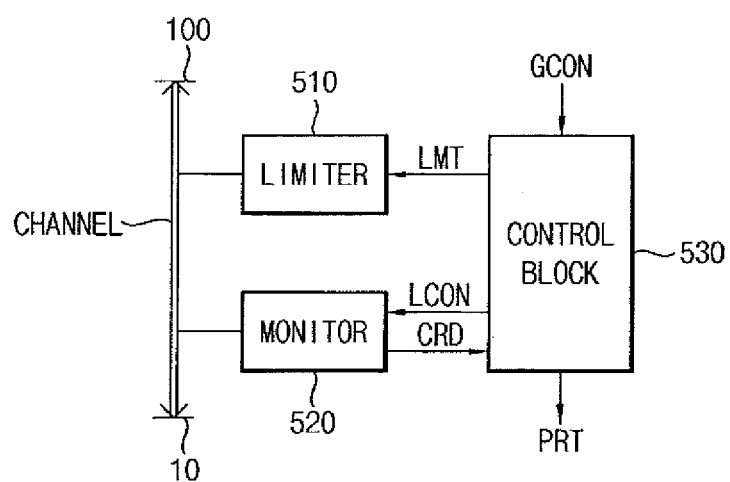
FIG. 3 is a block diagram illustrating a service controller according to an exemplary embodiment of the inventive concept.

FIG. 3 is a block diagram illustrating a service controller according to an exemplary embodiment of the inventive concept.

FIG. 3 illustrates one service controller 500a corresponding to one master device 100. The service controllers 501, 502 and 503 in FIG. 1 may have substantially the same configuration as FIG. 3, respectively. In an exemplary embodiment, the service controller 500a may be coupled to the channel between the corresponding master device 100 and the interconnect device 10. In an exemplary embodiment, the service controller may be included in the corresponding master device 100 as a portion thereof.

Referring to FIG. 3, the service controller 500a may include a limiter 510, a monitor 530 and a control block 530.

The monitor 520 may generate a credit value CRD by detecting a service requirement level of the corresponding master device 100 in realtime. The service requirement level may be detected as a bandwidth, outstanding count value and/or an average latency. The bandwidth is a data amount that is served or transferred (e.g., to a master device) during a unit time. As described below, the credit value CRD may correspond to the bandwidth. The outstanding count value is the number of the requests that have been issued but not yet serviced. The latency is a delay from when the master device issues the request for service to when the requested service has completed. The monitor 520 in FIG. 3 may be configured to further provide at least one of the bandwidth, the outstanding count value and the average latency in addition to the credit value CRD.

The control block 530 may generate a local control signal LCON to control the monitor 520 based on the operational environment change. The operational environment change may be provided with the global control signal GCON as illustrated in FIG. 1 or the state signals ST1, ST2 and ST3. Further the control block 530 may generate a priority information signal PRT for the request from the corresponding master device 100 based on the credit value CRD. The priority information signal PRT may be provided to the interconnect device 10 for an arbitrating operation therein. At least a portion of the control block 530 may be implemented as a special function register (SFR) that performs predetermined process sequences in response to stored values and input signals.

The limiter 510 may block the request flow from the corresponding master device 100 in response to a limit signal LMT from the control block 530. The limiter 510 may be omitted in the service controller 500a depending on the operational characteristics of the corresponding master device 100.

Figure 4:
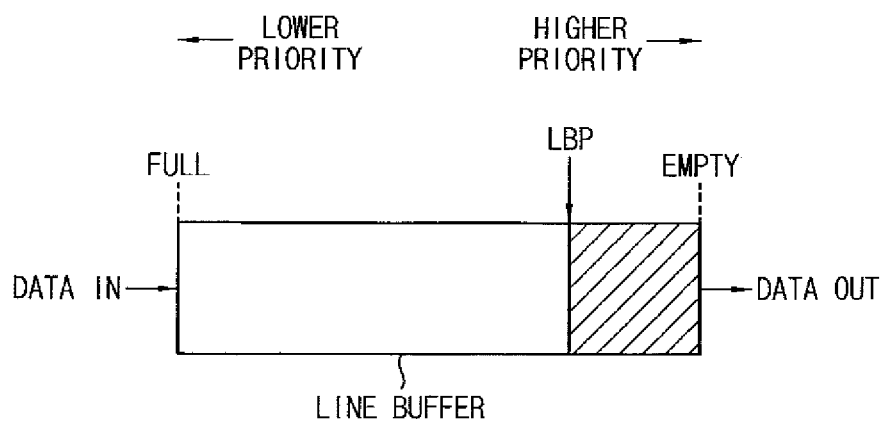
FIG. 4 is a diagram for describing a method of detecting a service requirement level of a master device according to an exemplary embodiment of the inventive concept.

FIG. 4 is a diagram for describing a method of detecting a service requirement level of a master device according to an exemplary embodiment of the inventive concept.

Depending on the operational characteristic of the master device, the service requirement level may be represented as a bandwidth. The bandwidth is a data amount that is served or transferred during a unit time. For example, data may be served to the master device (e.g., a display controller) from the slave device (e.g., a memory controller) that is coupled to the master device through the interconnect device. The master device may store the served data in a data buffer to perform its own function on the stored data. Performing of the function on the stored data and outputting the result may be referred to as consuming the data.

A data occupancy state of a line buffer in the master device is illustrated using oblique lines in FIG. 4 and the data occupancy state may be represented as a line buffer pointer LBP. The line buffer pointer LBP is increased toward the full position when data is served (DATA IN) from the slave device and the line buffer pointer LBP is decreased toward the empty position when the stored data is consumed (DATA OUT) by the master device.

The higher priority may be assigned as the line buffer pointer LBP is decreased and the lower priority may be assigned as the line buffer pointer LBP is increased. The higher priority indicates the higher bandwidth requirement level. The relation between the line buffer pointer LBP and the priority may be determined according to the scenario of the system. For example, the entire range of the line buffer pointer LBP between the full position and the empty position may be partitioned into a plurality of sub ranges, and the priority values may be assigned sequentially to the sub ranges.

Figure 5:
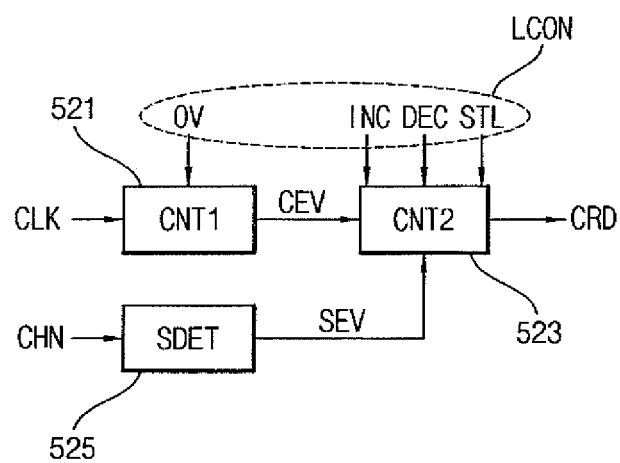
FIG. 5 is a block diagram illustrating an exemplary monitor in the service controller of FIG. 3.

FIG. 5 is a block diagram illustrating an exemplary monitor in the service controller of FIG. 3.

Referring to FIG. 5, a monitor 520a may include a first counter (CNT1) 521, a second counter (CNT2) 523 and a service detector (SDET) 526.

The first counter 521 generates a first event signal CEV that is activated with a period corresponding to an overflow value OV. For example, the first counter 521 may count clock cycles of a clock signal CLK and the first event signal CEV may be a pulse signal that is activated whenever the counting value reaches the overflow value OV. The clock signal CLK may be an operational clock signal of the corresponding master device 100.

The service detector 525 generates a second event signal SEV based on channel signals CHN transferred between the corresponding master device 100 and the interconnect device 10. The second event signal SEV is activated when the corresponding master device 100 is serviced by the slave device (e.g., receives data from the slave device).

The second counter 523 increases the credit value CRD by a unit increment value INC in response to each activation of the first event signal CEV and decreases the credit value CRD by a unit decrement value DEC in response to each activation of the second event signal SEV. In an exemplary embodiment, the second counter 523 may decrease the credit value CRD when a steal value STL is provided. The control block 530 of FIG. 3 may provide the steal value only when the predetermined operational environment change occurs so that the credit value CRD may be decreased one time.

As such, the bandwidth requirement level of the corresponding master device 100 may be represented in realtime by the credit value. The greater credit value CRD may represent the higher bandwidth requirement level and the smaller credit value CRD may represent the lower bandwidth requirement level.

The overflow value OV, the unit increment value INC, the unit decrement value DEC, and the steal value STL may be included in the local control signal LCON from the control block 530. The overflow value OV, the unit increment value INC, the unit decrement value DEC, and the steal value STL may be determined based on the scenarios of the system and the control block 530 may change the values OV, INC, DEC and STL depending on the operational environment change. For example, the values OV, INC, DEC and STL may be provided to the control block 530 during an initializing process of the system and the control block 530 may store the provided values. The user may determine the values OV, INC, DEC and STL considering the operational characteristics of the respective master devices. Through the distributed control scheme with respect to each master device, the complex scenarios of the system may be implemented conveniently and efficiently.

Figure 6:
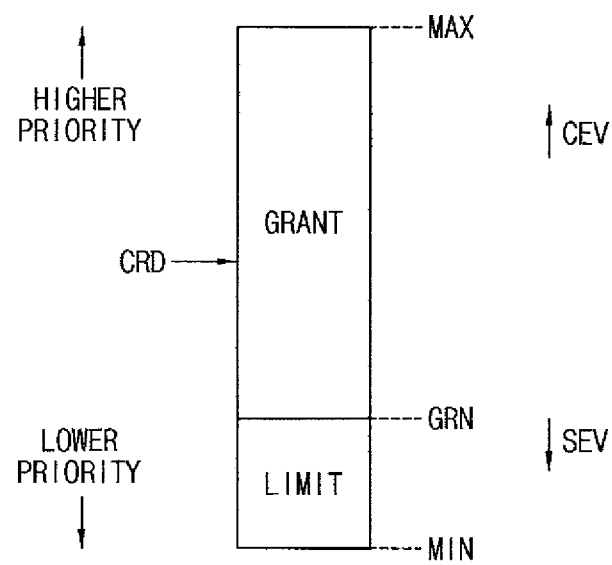
FIG. 6 is a diagram for describing a method of controlling a request flow from a master device based on a credit value according to an exemplary embodiment of the present inventive concept.
Figure 7:
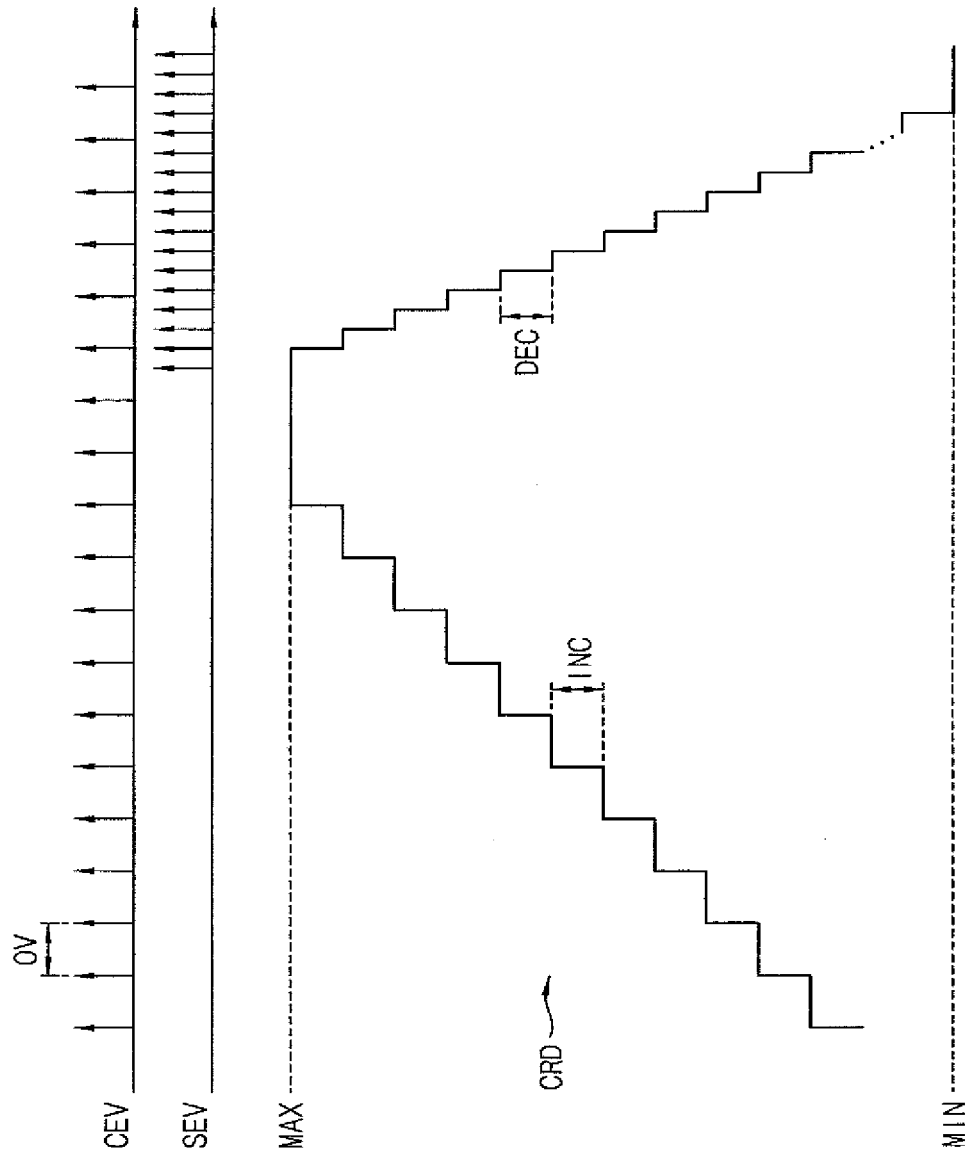
FIG. 7 is a diagram illustrating an exemplary operation of the monitor of FIG. 5.

FIG. 6 is a diagram for describing a method of controlling a request flow from a master device based on a credit value according to an exemplary embodiment of the present inventive concept, and FIG. 7 is a diagram illustrating an exemplary operation of the monitor of FIG. 5.

Referring to FIGS. 6 and 7, the credit value CRD may be increased toward a maximum value MAX whenever the first event signal CEV is activated and the credit value CRD may be decreased toward a minimum value MIN whenever the second event signal SEV is activated. The activation period of the first event signal CEV reflects a target bandwidth and the average activation period of the second event signal SEV reflects a realtime bandwidth of the current service. As illustrated in FIG. 7, the credit value CRD is increased gradually if the realtime bandwidth is smaller than the target bandwidth and the credit value CRD is decreased gradually if the realtime bandwidth is greater than the target bandwidth.

The control block 530 in FIG. 3 may assign the higher priority to the greater credit value CRD and the lower priority to the smaller credit value CRD. In general, the interconnect device 10 is designed to promote the request flow of the master device of the higher priority and demote the request flow of the master device of the lower priority.

The control block 530 in the service controller 500a may change at least one of the overflow value OV, the unit increment value INC and the unit decrement value DEC based on the operational environment change to control the request flow from the corresponding master device 100. For example, the control block 530 may promote the request flow of the corresponding master device 100 by decreasing the overflow value OV, increasing the unit increment value INC or decreasing the unit decrement value DEC. Also the control block 530 may demote the request flow from the corresponding master device 100 by increasing the overflow value OV, decreasing the unit increment value INC or increasing the unit decrement value DEC.

As described with reference to FIG. 3, the service controller 500a may further include the limiter 510 that is configured to block the request flow from the corresponding master device 100 in response to the limit signal LMT from the control block 530. Exemplary embodiments of the limiter 510 are described below with reference to FIGS. 9 through 13.

When the service controller 500a includes the limiter 510, the control block 530 may generate the limit signal LMT that is activated when the credit value CRD is smaller than a grant value GRN. The control block 530 may change the grant value GRN based on the operational environment change to control the request flow from the corresponding master device 100. In other words, the request flow from the corresponding master device 100 may be promoted by decreasing the grant value GRN and demoted by increasing the grant value GRN.

Figure 8:
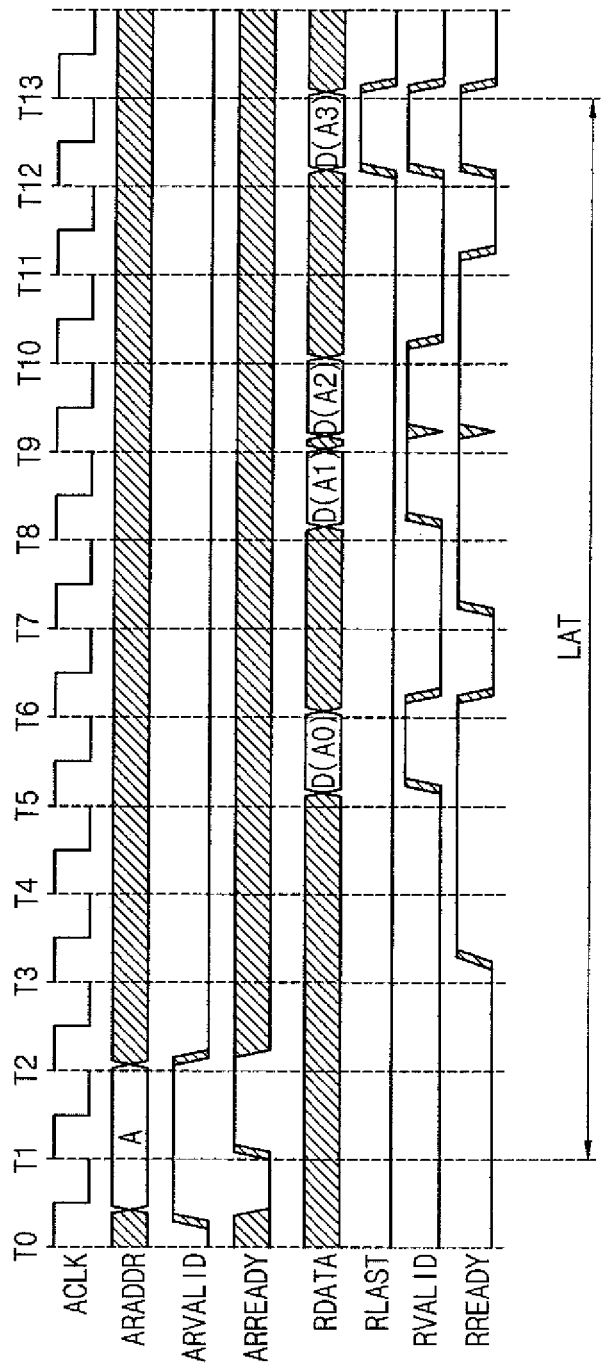
FIG. 8 is a timing diagram illustrating an exemplary transaction performed by a system.

FIG. 8 is a timing diagram illustrating an exemplary transaction performed by a system.

FIG. 8 illustrates an example of a read transaction according to an advanced extensible interface (AXI) protocol. The AXI protocol adopts a handshake scheme using valid signals and ready signals.

According to the handshake scheme, if a first master interface and a slave interface transfer a signal to a second master interface and the slave interface, the first master device activates a valid signal, and then the second master device activates a ready signal corresponding to the valid signal when the second master device is ready to receive the signal. Sampling of signals is performed in response to a global clock signal ACLK at both of the master interface and the slave interface. For example, the sampling of signals may be performed in response to rising edges of the global clock signal ACLK. In an exemplary embodiment, a valid signal transfer is fulfilled when both of the valid signal and the ready signal are activated at the same rising edge of the global clock signal ACLK.

As illustrated in FIG. 8, the master device 100 corresponding to the master interface activates a request valid signal ARVALID when the master device transfers a signal and the interconnect device 10 corresponding to the slave interface activates a request ready signal ARREADY when the interconnect device 10 is ready to receive the signal from the master device 100. In the same way, the interconnect device 10 activates a service valid signal RVALID when the interconnect device 10 transfers a signal and the master device 100 activates a service ready signal RREADY when the master device is ready to receive the signal from the interconnect device 10.

The rising edges of the global clock signal ACLK are represented as timing points T0 through T13 in FIG. 8. The master interface 100 corresponding to the master interface transfers a read request signal ARADDR to the interconnect device 10 corresponding to the slave interface by activating the request valid signal ARVALID corresponding to a service request signal. The read request signal ARADDR is transferred successfully at the timing point T2 when both of the request valid signal ARVALID and the request ready signal ARREADY are activated. The master device 100 may determine the timing point T1 as a service request timing point based on the request valid signal ARVALID regardless of the request ready signal, that is, regardless of the success of the valid signal transfer.

In response to the read request, data D(A0), D(A1), D(A2) and D(A3) of a burst type are transferred from the interconnect device 10 to the master device 100. The data D(A0), D(A1), D(A2) and D(A3) are transferred successfully at timing points T6, T9, T10 and T13, respectively, when both of the service valid signal RVALID and the service ready signal RREADY are activated. The interconnect device 10 activates a service done signal RLAST with transferring the last data D(A3), and the timing point T13 is determined as a service done timing point.

The service controller 500a of FIG. 3 may detect the latency CLAT based on the request signals ARVALID and ARREADY and the service signals RVALID, RREADY and RLAST among the channel signals CHN between the master device 100 and the interconnect device 10. The latency may be a delay from when the master device issues the request for service to when the requested service has completed. In other words, the latency is a measure of the time delay experienced in transferring data through the corresponding master device. For example, the latency may be represented as a cycle number of a clock signal.

Figure 9:
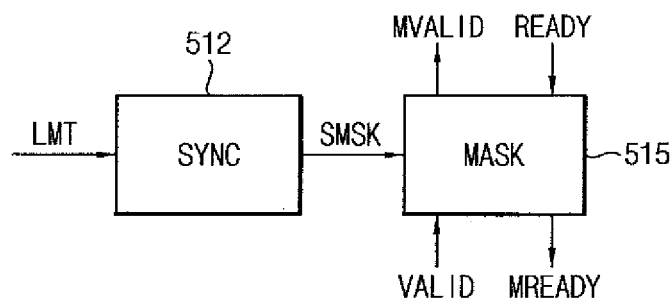
FIG. 9 is a block diagram illustrating an exemplary limiter included in the service controller of FIG. 3.

FIG. 9 is a block diagram illustrating an exemplary limiter included in the service controller of FIG. 3.

Referring to FIG. 9, a limiter 510 includes a synchronizer (SYNC) 512 and a mask unit (MASK) 515. The synchronizer 512 generates a synchronized limit signal SMSK based on the limit signal LMT from the control block 530. The mask unit 515 blocks the request flow between the corresponding master device 100 and the interconnect device 10 based on the synchronized limit signal SMSK. In the handshaking scheme, the request flow may be blocked by masking the signals VALID and READY to generate masked signals MVALID and MREADY. The synchronizer 512 may control transition timing points of the limit signal LMT to prevent errors of signal transfer according to the handshaking scheme.

Figure 10:
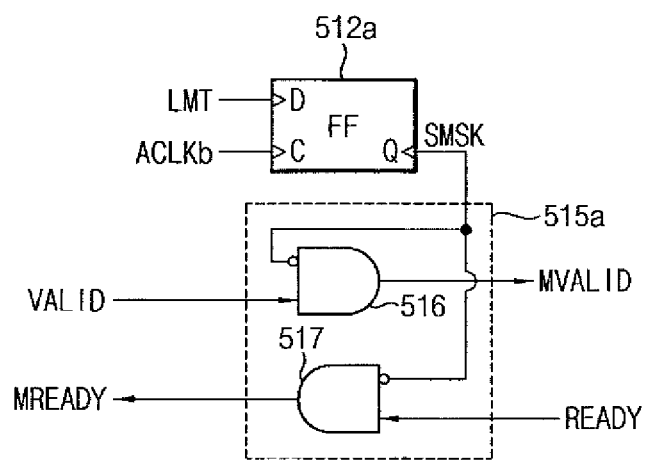
FIG. 10 is a circuit diagram illustrating an exemplary limiter included in the service controller of FIG. 3.

FIG. 10 is a circuit diagram illustrating an exemplary limiter included in the service controller of FIG. 3.

Referring to FIG. 10, a limiter 510a includes a flip-flop 512a and a mask unit 515a. The flip-flop 512a corresponds to the synchronizer 512 of FIG. 9.

The flip-flop 512a generates a synchronized limit signal SMSK based on an inverted global clock signal ACLKb and a limit signal LMT provided from the control block 530. The flip-flop 512a samples the limit signal LMT in response to a rising edge of the inverted global clock signal ACLKb to generate the synchronized limit signal SMSK. The rising edge of the inverted global clock signal ACLKb corresponds to the falling edge of the global clock signal ACLK and thus the transition timing points of the synchronized limit signal SMSK are synchronized to the falling edges of the global clock signal ACLK.

The mask unit 515a blocks the request from the corresponding master device 100 in response to the synchronized limit signal SMSK. The mask unit 515a may include a first logic gate 516 and a second logic gate 517. The first logic gate 516 outputs a masked valid signal MVALID by performing a logic operation on the synchronized limit signal SMSK and a valid signal VALID from the corresponding master device 100. The second logic gate 517 outputs a masked ready signal MREADY by performing a logic operation on the synchronized limit signal SMSK and a ready signal READY from the interconnect device 10.

When the synchronized limit signal SMSK is deactivated in a logic low level, the mask unit 515a outputs the masked valid signal MVALID and the masked ready signal MREADY having the same logic levels as the valid signal VALID and the ready signal READY, respectively. When the synchronized limit signal SMSK is activated in a logic high level, the mask unit 515a outputs the masked valid signal MVALID and the masked ready signal MREADY deactivated in the logic low level, regardless of the logic levels of the valid signal VALID and the ready signal READY.

Figure 11:
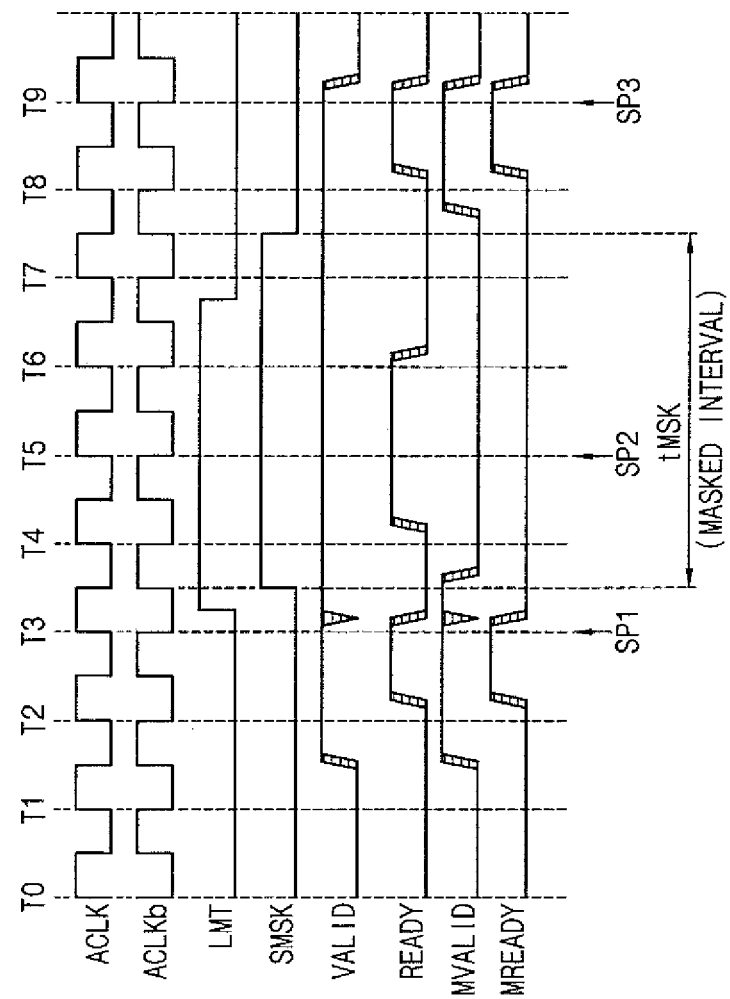
FIG. 11 is a timing diagram illustrating an exemplary operation of the limiter of FIG. 10.

FIG. 11 is a timing diagram illustrating an exemplary operation of the limiter of FIG. 10.

As described with reference to FIG. 8, the master device 100 corresponding to a master interface activates a valid signal VALID when transferring a signal, and then the interconnect device 10 corresponding to a slave interface activates a ready signal READY when the interconnect device 10 is ready to receive the signal. Through the mask unit 515a, the interconnect device 10 receives the masked valid signal MVALID instead of the valid signal VALID from the master device 100 and the master device 100 receives the masked ready signal MREADY instead of the ready signal from the interconnect device 10. In other words, the master device 100 determines that the successful signal transfer is achieved when both of the valid signal VALID and the masked ready signal MREADY are activated at the same rising edge of the global clock signal ACLK, and the interconnect device 10 determines that the successful signal transfer is achieved when both of the masked valid signal MVALID and the ready signal READY are activated at the same rising edge of the global clock signal ACLK. Due to such discrepancy in determining the successful signal transfer, only one of the master device 100 and the interconnect device 10 determines that the successful signal transfer is achieved and the other of the master device 100 and the interconnect device 10 determines that the successful signal transfer is not achieved.

To prevent such errors, the limiter 510a of FIG. 10 synchronizes start and end timing points of a masked interval tMSK to the falling edges of the global clock signal ACLK. In other words, the transition timing points of the synchronized limit signal SMSK are synchronized to the falling edges of the global clock signal ACLK, that is, the rising edges of the inverted global clock signal ACLKb. Accordingly the start and end timing points (the falling edges of the global clock signal ACLK) of the masked interval tMSK may be definitely separated from the sampling timing points (the rising edges of the global clock signal ACLK) of the master device 100 and the interconnect device 10, to prevent the errors due to the discrepancy in determining the successful signal transfer.

At the sampling timing points SP1 and SP3 outside the masked interval tMSK, the general handshake operation is performed because the masked valid and ready signals MVALID and MREADY have the same logic levels as the original valid and ready signals VALID and READY, and the signal transfer is performed successfully. At the sampling timing point SP2 within the masked interval tMSK, the masked valid and ready signals MVALID and MREADY are deactivated in the logic low level even though the original valid and ready signals VALID and READY are activated in the logic high level. Thus both of the master device 100 and the interconnect device 10 determine based on the deactivated masked valid and ready signals MVALID and MREADY, respectively, that the successful signal transfer is not achieved at the timing point SP2.

Figure 12:
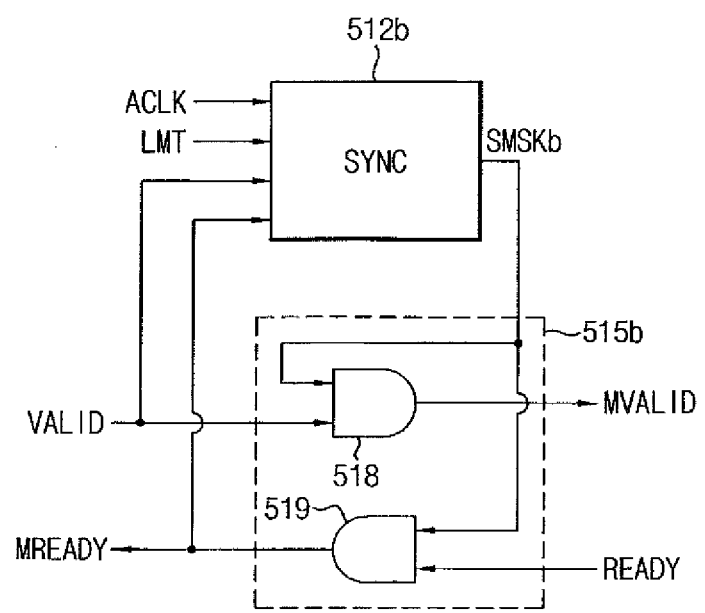
FIG. 12 is a circuit diagram illustrating an exemplary limiter included in the service controller of FIG. 3.

FIG. 12 is a circuit diagram illustrating an exemplary limiter included in the service controller of FIG. 3.

Referring to FIG. 12, a limiter 510b includes a synchronizer 512b and a mask unit 515b.

The synchronizer 512b generates a synchronized limit signal SMSKb based on a limit signal LMT provided from the control block 530, a global clock signal ACLK, a valid signal VALID and a ready signal READY. In contrast to the embodiment of FIG. 10, the synchronized limit signal SMSKb may be activated in the logic low level. The operation of the synchronizer 512b is described below with reference to FIG. 13.

The mask unit 515b blocks the request from the corresponding master device 100 in response to the synchronized limit signal SMSKb. The mask unit 515b may include a first logic gate 518 and a second logic gate 519. The first logic gate 518 outputs a masked valid signal MVALID by performing a logic operation on the synchronized limit signal SMSKb and a valid signal VALID from the corresponding master device 100. The second logic gate 519 outputs a masked ready signal MREADY by performing a logic operation on the synchronized limit signal SMSKb and a ready signal READY from the interconnect device 10.

When the synchronized limit signal SMSKb is deactivated in a logic high level, the mask unit 515b outputs the masked valid signal MVALID and the masked ready signal MREADY having the same logic levels as the valid signal VALID and the ready signal READY, respectively. When the synchronized limit signal SMSKb is activated in a logic low level, the mask unit 515b outputs the masked valid signal MVALID and the masked ready signal MREADY deactivated in the logic low level, regardless of the logic levels of the valid signal VALID and the ready signal READY.

Figure 13:
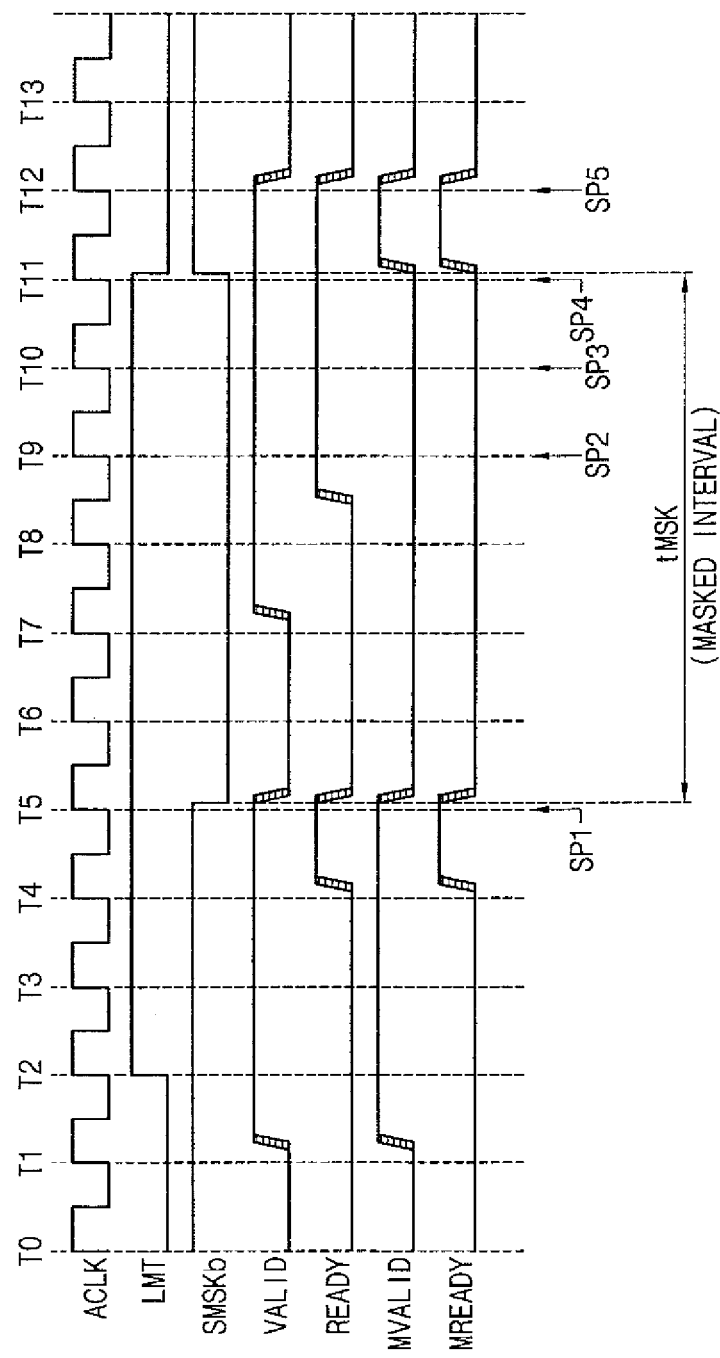
FIG. 13 is a timing diagram illustrating an exemplary operation of the limiter of FIG. 12.

FIG. 13 is a timing diagram illustrating an exemplary operation of the limiter of FIG. 12.

As described with reference to FIG. 8, the master device 100 corresponding to a master interface activates a valid signal VALID when transferring a signal, and then the interconnect device 10 corresponding to a slave interface activates a ready signal READY when the interconnect device 10 is ready to receive the signal. Through the mask unit 515b, the interconnect device 10 receives the masked valid signal MVALID instead of the valid signal VALID from the master device 100 and the master device 100 receives the masked ready signal MREADY instead of the ready signal from the interconnect device 10. In other words, the master device 100 determines that the successful signal transfer is achieved when both of the valid signal VALID and the masked ready signal MREADY are activated at the same rising edge of the global clock signal ACLK, and the interconnect device 10 determines that the successful signal transfer is achieved when both of the masked valid signal MVALID and the ready signal READY are activated at the same rising edge of the global clock signal ACLK.

Due to such discrepancy in determining the successful signal transfer, only one of the master device 100 and the interconnect device 10 determines that the successful signal transfer is achieved and the other of the master device 100 and the interconnect device 10 determines that the successful signal transfer is not achieved.

To prevent such errors, the synchronizer 512b in the limiter 510b of FIG. 12 synchronizes a start timing point of a masked interval tMSK to the timing point just after the successful signal transfer is achieved. For example, the synchronizer 512b activates the masked limit signal SMSKb in the logic low level just after the sampling timing point SP1 when the successful signal transfer is achieved. The synchronizer 512b may synchronize an end timing point of the masked interval tMSK to the deactivation timing point of the limit signal LMT.

At the sampling timing points SP1 and SP5 outside the masked interval tMSK, the general handshake operation is performed because the masked valid and ready signals MVALID and MREADY have the same logic levels as the original valid and ready signals VALID and READY, and the signal transfer is performed successfully. At the sampling timing points SP2, SP3 and SP4 within the masked interval tMSK, the masked valid and ready signals MVALID and MREADY are deactivated in the logic low level regardless of the original valid and ready signals VALID and READY. Thus both of the master device 100 and the interconnect device 10 determine based on the deactivated masked valid and ready signals MVALID and MREADY, respectively, that the successful signal transfer is not achieved at the timing points SP2, SP3 and SP4.

FIG. 14 is a diagram illustrating a method of controlling a system according to an exemplary embodiment of the inventive concept.

FIG. 14 illustrates exemplary scenarios to control request flows in a system with respect to several cases. The system includes at least a processor, a modem and a display controller as master devices and at least a memory controller as a slave device. The master devices may generate requests to demand services from the slave devices, respectively.

The master device or the master intellectual property (IP) may be divided into a hard realtime IP, a soft realtime IP and a best effort IP depending on the type or the operational characteristic of the master IP.

The hard realtime IP may be an IP such as a display device that consumes data steadily and thus requires a certain minimum bandwidth. An underrun of a data buffer in the hard realtime IP may be caused if the minimum bandwidth is not satisfied. The hard realtime IP buffers the serviced data sufficiently in the data buffer if the minimum bandwidth is satisfied and controls the request flow itself such that the hard realtime IP issues the request according to the amount of the consumed data.

To reduce a manufacturing cost, an external modem chip may share a memory in the SOC. Such an external modem chip may not operate normally if an average latency requirement level is not satisfied. It may be difficult to determine and fix the average latency requirement level because the type of the modem chip varies.

The soft realtime IP may be an IP such as a video codec that requires an average operation time. In an exemplary embodiment, a video codec is software that enables compression or decompression of digital video. The video codec may have a frame rate such as 30 or 60 frames per second and may require an average decode/encode time. The bandwidth requirement level of the video codec may be changed according to respective frames and the video codec may require an average encoding time and/or an average decoding time. The video codec may perform its operations immediately prior to the encoding/decoding of the next frame if the request flow is not controlled but the issue of the requests is limited due to a dependency between the previously and currently processed data. Thus the operation speed of the video codec may satisfy the determined frame rate if the required bandwidth and/or latency are ensured, but the operation speed of the codec may be sharply decreased if the latency becomes greater than a threshold value.

The best effort IP may be an IP such as a two-dimensional or a three-dimensional graphics engine that issues requests endlessly if the request flow is not controlled and thus request flow control is needed in the best effort IP. Maximum service requirement levels of the best effort IP may be supported if the other IP of higher priority than the best effort IP is not in the urgent state. If the other IP is in the urgent state, the request flow from the best effort IP may be limited so that the other IP of the higher priority exits from the urgent state.

A latency-oriented IP such as a central processing unit (CPU) may have a variable bandwidth requirement level depending on the situation but its performance is directly influenced by an average latency. The request flow of the latency-oriented IP needs to be controlled based on the latency because the average bandwidth requirement level may not be defined.

The first case in FIG. 14 represents a default case that the system operates in a normal state. The processor corresponds to a typical best effort IP and the display controller corresponds to a typical realtime IP. The above-described overflow value OV, the grant value GRN and the unit decrement value DEC may be determined properly depending on the operational characteristics of the master devices. Even though the unit increment value INC is set to one for all the cases and all the master devices, the unit increment value INC may be changed depending on the scenarios and the operational characteristics of the master devices. The overflow value OV may correspond to a cycle number of an operational clock signal. For example, a cyclic period of the operational clock signal may be one nano-second. In the first case, as an example, the display controller may operate at 640 MB/sec and the processor may operate at 2560 MB/sec.

The second case in FIG. 14 may correspond to the case when the third state signal ST3 described with reference to FIG. 1 is activated, that is, when the data buffer rate of the display controller becomes lower than the threshold rate and thus an urgent service is required for the display controller. In this case, the overflow value of the process corresponding to the best effort IP is increased greater than the default case to demote the request flow from the processor and the overflow value of the display controller is decreased smaller than the default case to promote the request flow from the display controller. In addition, the credit value of the processor may be decreased by the steal value when the operational environment is changed from the first case to the second case, to promptly demote the request flow from the processor. In the second case, as an example, the display controller may operate at 1280 MB/sec and the processor may operate at 1920 MB/sec.

The third case in FIG. 14 may correspond to the case when the first state signal ST1 described with reference to FIG. 1 is activated, that is, when the operational temperature of the memory controller becomes greater than the threshold temperature and thus the operational speed of the memory controller is reduced. In this case, the overflow value of the process is increased greater than the default case to demote the request flow from the processor and the overflow value of the display controller is decreased smaller than the default case to ensure the required bandwidth of the display controller. The unit decrement value may be increased greater than the default case with respect to all of the master devices to demote the entire request flows in the system. In addition, the credit value of the processor may be decreased by the steal value when the operational environment is changed from the first case to the third case, to promptly demote the request flow from the processor. In the third case, as an example, the display controller may operate at 640 MB/sec and the processor may operate at 960 MB/sec.

The fourth case in FIG. 14 may correspond to the case when both of the first state signal ST1 and the third state signal are activated, that is, when the operational temperature of the memory controller becomes greater than the threshold temperature and thus the operational speed of the memory controller is reduced as well as the data buffer rate of the display controller becomes lower than the threshold rate and thus the urgent service is required for the display controller. In this case, the overflow value of the process is increased greater than the second and third cases to further demote the request flow from the processor and the overflow value of the display controller is decreased smaller than the default case to ensure the required bandwidth of the display controller. The unit decrement value may be increased greater than the default case with respect to the processor and the modem to demote the request flows from the processor and the modem thereby further ensuring the required bandwidth of the display controller. In addition, the credit value of the processor may be decreased by the steal value when the operational environment is changed from the first, second or third case to the fourth case, to promptly demote the request flow from the processor. In the fourth case, as an example, the display controller may operate at 1280 MB/sec and the processor may operate at 320 MB/sec.

The fifth case in FIG. 14 may correspond to the case when the second state signal ST2 described with reference to FIG. 1 is activated, that is, when the modem is not serviced by the memory controller for the threshold time. In this case, the grant value of the process may be set to an infinite value INF to completely block the request flow from the processor. For example, setting the grant value to the infinite value INF may activate the limit signal LMT regardless of the credit value. The infinite value INF may be a value that is higher than any possible grant value or higher than a current grant value of the processor. By activating the limit signal LMT in response to the global control signal indicating the fifth case, the request flow from the processor may be blocked completely. In addition, the credit value of the processor may be decreased by the steal value when the operational environment is changed from the first case to the fifth case.

As such, the system and the method of controlling the system according to exemplary embodiments of the inventive concept may control the request flows from the master devices adaptively depending on the operational environment change to enhance quality of service (QOS) in the system. Further the complex scenarios of the system may be implemented conveniently and efficiently through the distributed control scheme with respect to each master device.

Figure 15:
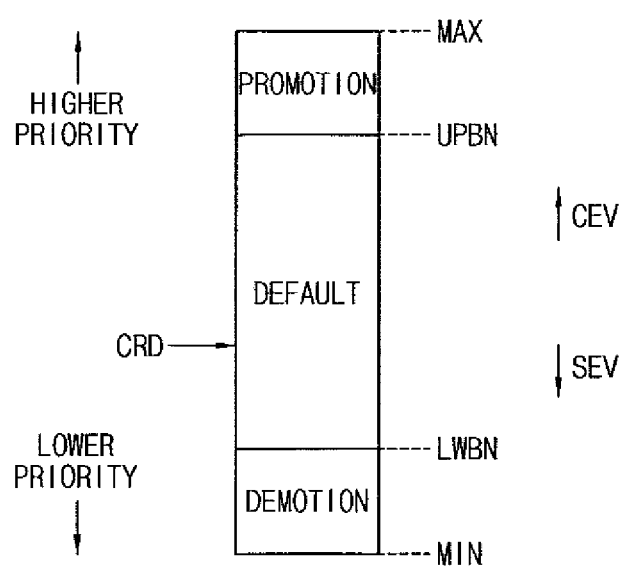
FIG. 15 is a diagram for describing a method of controlling a request flow from a master device based on a credit value according to an exemplary embodiment of the present inventive concept.
Figure 16:
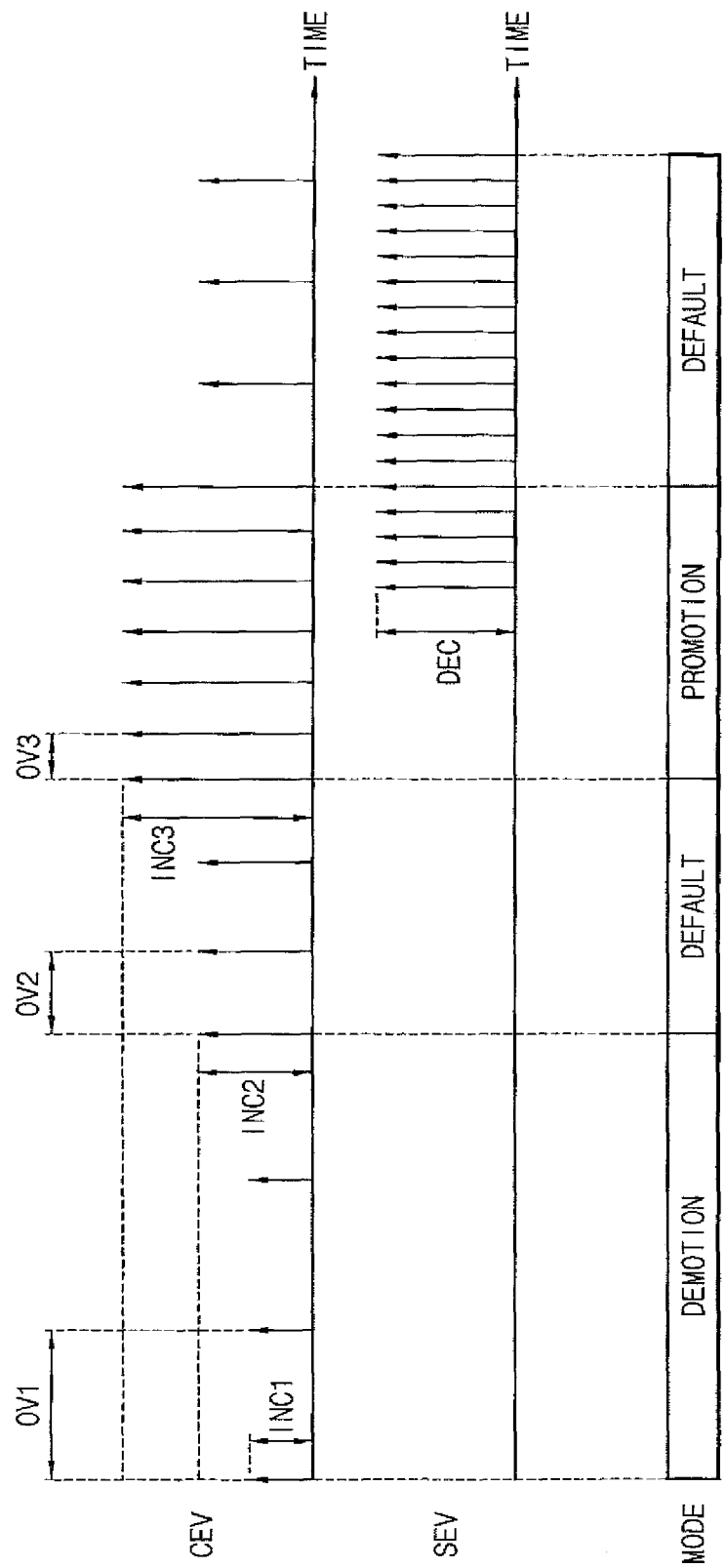
FIG. 16 is a diagram illustrating an exemplary operation of the monitor of FIG. 5.

FIG. 15 is a diagram for describing a method of controlling a request flow from a master device based on a credit value according to an exemplary embodiment of the present inventive concept, and FIG. 16 is a diagram illustrating an exemplary operation of the monitor of FIG. 5.

As described above, the credit value CRD may be increased toward the maximum value MAX whenever the first event signal CEV is activated and the credit value CRD may be decreased toward the minimum value MIN whenever the second event signal SEV is activated. The control block 530 in FIG. 3 may assign the higher priority to the greater credit value CRD and the lower priority to the smaller credit value CRD.

Referring to FIGS. 15 and 16, the control block 530 in FIG. 3 may set a plurality of operation modes by dividing ranges of the credit value CRD and change the values OV, INC and DEC of the local control signal LCON based on the operation modes to control the request flow from the corresponding master device.

For example, the operation modes may include a promotion mode, a default mode and a demotion mode. The promotion mode corresponds to the credit value CRD greater than an upper boundary value UPBN, the default mode corresponds to the credit value CRD smaller than the upper boundary value UPBN and greater than a lower boundary value LWBN, and the demotion mode corresponds to the credit value CRD smaller than the lower boundary value LWBN.

The control block 530 may change the values OV, INC and DEC of the local control signal LCON based on the operation modes such that the corresponding master device is allowed to have a larger bandwidth in the promotion mode than the default mode and a larger bandwidth in the default mode than the demotion mode. For example, the control block 530 may set the overflow value OV2 of the default mode smaller than the overflow value OV1 of the demotion mode, and the overflow value OV3 of the promotion mode smaller than the overflow value OV2 of the default mode. In addition, the control block 530 may set the unit increment value INC2 of the default mode greater than the unit increment value INC1 of the demotion mode, and the unit increment value INC3 of the promotion mode greater than the unit increment value INC2 of the default mode. Even though FIG. 16 shows the same unit decrement value DEC regardless of the operation modes, the unit decrement value DEC may be changed depending on the operation mode. In other words, the request flow may be promoted by decreasing the unit decrement value DEC and the request flow may be demoted by increasing the unit decrement value DEC.

Figure 17:
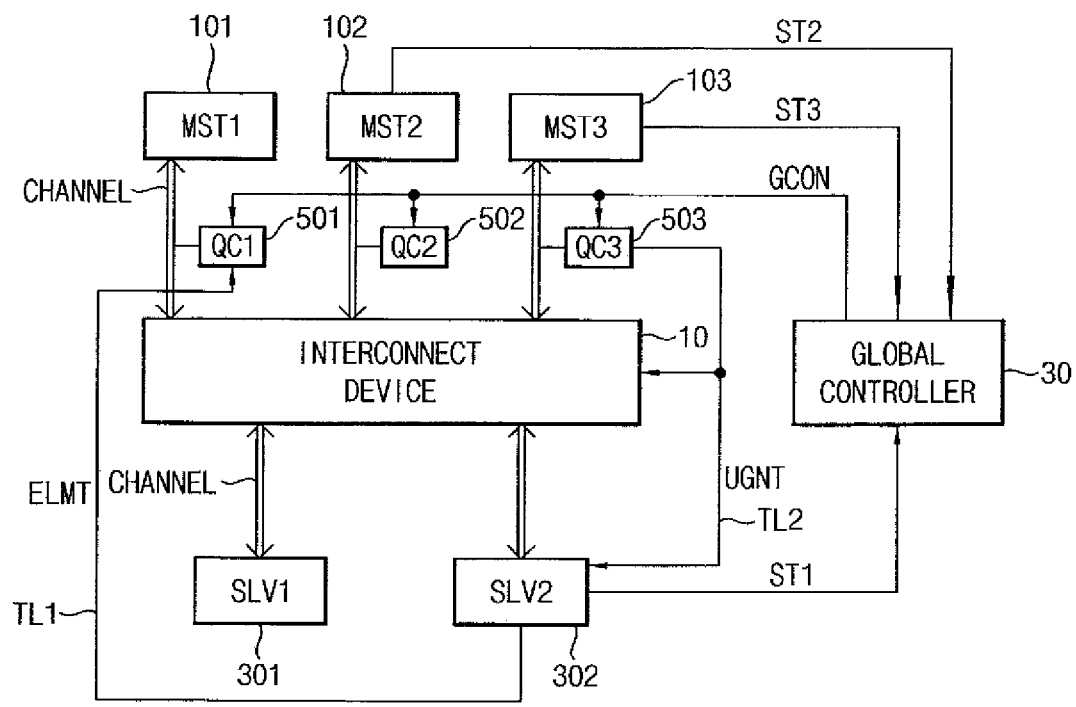
FIG. 17 is a block diagram illustrating a system according to an exemplary embodiment of the inventive concept.

FIG. 17 is a block diagram illustrating a system according to an exemplary embodiment of the inventive concept. The system 1000a of FIG. 17 is similar to the system 1000 of FIG. 1, and thus any repeated description may be omitted.

Referring to FIG. 17, a system 1000a includes master devices (MST1, MST2, MST3) 101, 102 and 103, slave devices (SLV1, SLV2) 301 and 302, an interconnect device 10 and service controllers (QC1, QC2, QC3) 501, 502 and 503. In some exemplary embodiments, the system 1000a may further include a global controller 30.

The master devices 101, 102 and 103 may generate requests to demand services from at least one of the slave devices 301 and 302, respectively. The slave devices 301 and 302 and the master devices 101, 102 and 103 are coupled to the interconnect device 10 through respective channels. The interconnect device 10 performs an arbitrating operation on the requests from the master devices 101, 102 and 103. The interconnect device 10 may include at least one arbiter for performing the arbitrating operation. The service controllers 501, 502 and 503 control request flows from the master devices 101, 102 and 103 adaptively depending on an operational environment change of the system 1000.

The master devices 101, 102 and 103 may include at least one realtime master device. For example, the third master device 103 may be the realtime master device such as a display controller, and the second slave device 302 may be a memory controller for providing services to the master devices 101, 102 and 103. In this case, the service controller 503 corresponding to the realtime master device 103 may generate an urgent signal UGNT indicating that the realtime master device 103 requires an urgent service from the slave device 302.

The system 1000a may further include a transmission line TL2 that is point-to-point coupled between the slave device 302 and the service controller 503 corresponding to the realtime master device 103. The urgent signal UGNT may be transferred via the signal line TL2 directly from the service controller 503 corresponding to the realtime master device 103 to the slave device 302. Also the urgent signal UGNT may be provided to the interconnect device 10 and the interconnect device 10 may adjust priorities for the arbitrating operation in response to the urgent signal UGNT.

The master devices 101, 102 and 103 may include at least one best effort master device. For example, the first master device 101 may be the best effort master device such as a processor. In this case, the slave device 302 may generate an external limit signal ELMT based on the operational environment change, and the service controller 501 corresponding to the best effort master device 101 may block the request flow from the best effort master device 101 in response to the external limit signal ELMT.

The system 1000a may further include a transmission line TL1 that is point-to-point coupled between the slave device 302 and the service controller 501 corresponding to the best effort device 101. The external limit signal ELMT may be transferred via the signal line TL1 directly from the slave device 302 to the service controller 501 corresponding to the best effort master device 101.

Figure 18:
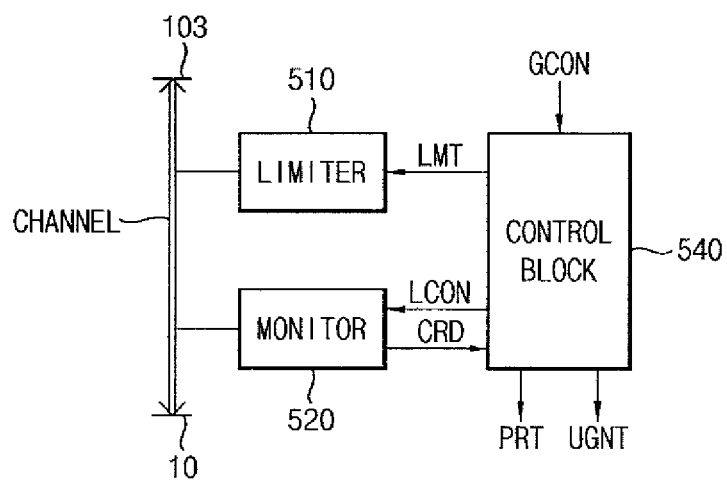
FIG. 18 is a block diagram illustrating an exemplary service controller in the system of FIG. 17.

FIG. 18 is a block diagram illustrating an exemplary service controller in the system of FIG. 17.

The service controller 503 in FIG. 18 may be one for controlling the request flow from the realtime master device 103 such as a display controller. The service controller 503 in FIG. 18 is similar to the service controller 500a in FIG. 3 except the control block 540.

The control block 540 may generate a local control signal LCON to control the monitor 520 based on the operational environment change. The operational environment change may be provided with the global control signal GCON as illustrated in FIG. 17 or the state signals ST1, ST2 and ST3. Further the control block 540 may generate a priority information signal PRT for the request from the corresponding master device 103 based on the credit value CRD. The priority information signal PRT may be provided to the interconnect device 10 for arbitrating an operation therein.

The control block 540 may generate, in addition to the priority information signal PRT, an urgent signal UGNT indicating that the realtime master device 103 requires an urgent service from the slave device 302. The urgent signal UGNT may be provided to the slave device 302 in realtime to promote the request flow from the realtime master device 103 or demote the request flow from other master devices.

At least a portion of the control block 540 may be implemented as a special function register (SFR) that performs predetermined process sequences in response to stored values and input signals.

Figure 19:
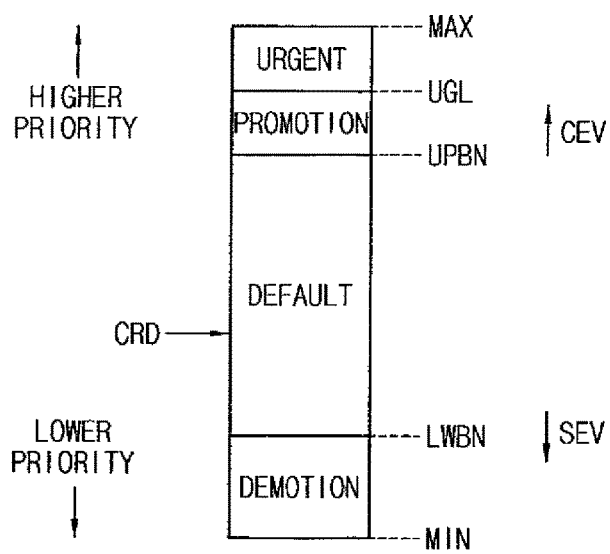
FIG. 19 is a diagram for describing a method of controlling a request flow from a master device based on a credit value according to an exemplary embodiment of the present inventive concept.

FIG. 19 is a diagram for describing a method of controlling a request flow from a master device based on a credit value according to an exemplary embodiment of the present inventive concept.

Referring to FIG. 19, the control block 540 may set a plurality of operation modes by dividing ranges of the credit value CRD and change the values OV, INC and DEC of the local control signal LCON based on the operation modes to control the request flow from the corresponding master device.

For example, the operation modes may include an urgent mode, a promotion mode, a default mode and a demotion mode. The urgent mode corresponds to the credit value CRD greater than an urgent level UGL and the promotion mode corresponds to the credit value CRD greater than an upper boundary value UPBN. The urgent level UGL may be equal to or greater than the upper boundary value UPBN. The default mode corresponds to the credit value CRD smaller than the upper boundary value UPBN and greater than a lower boundary value LWBN, and the demotion mode corresponds to the credit value CRD smaller than the lower boundary value LWBN.

As described with reference to FIG. 15, the control block 540 may change the values OV, INC and DEC of the local control signal LCON based on the operation modes such that the corresponding master device is allowed to have a larger bandwidth in the promotion mode than the default mode and a larger bandwidth in the default mode than the demotion mode.

In addition, the control block 540 may activate the urgent signal UGNT when the credit value CRD is greater than the urgent level UGL. As such, the realtime master device 103 may activate the urgent signal UGNT when the urgent service is required, and the urgent signal UGNT may be used to promote the request flow from the realtime master device 103 and/or demote the request flows from other master devices.

Figure 20:
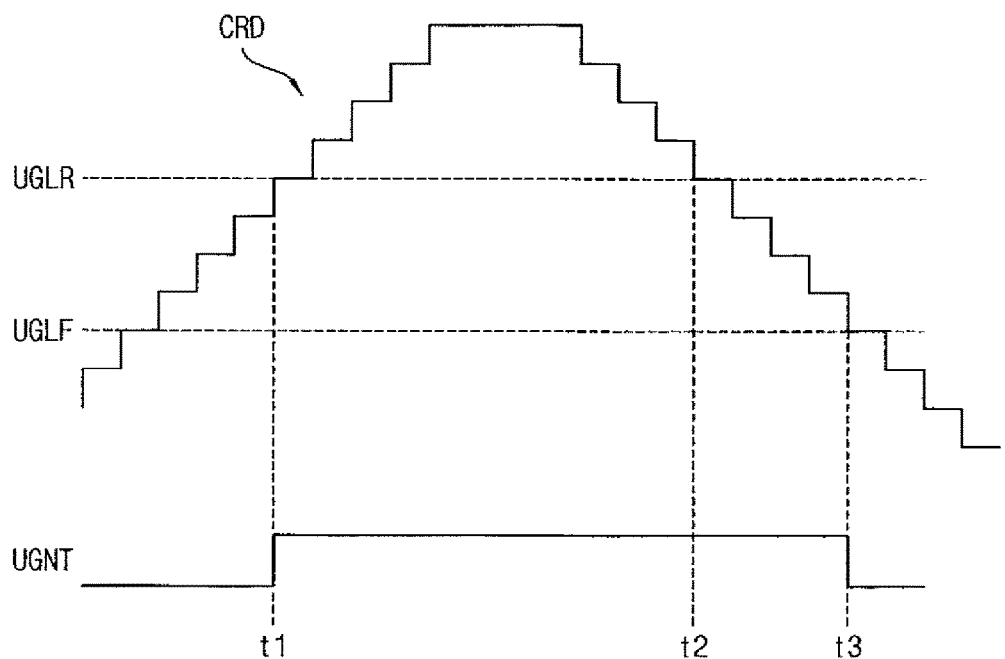
FIG. 20 is a diagram illustrating a method of generating an urgent signal according to an exemplary embodiment of the inventive concept.

FIG. 20 is a diagram illustrating a method of generating an urgent signal according to an exemplary embodiment of the inventive concept.

Referring to FIG. 20, the urgent signal UGNT may be generated according to a hysteresis scheme by setting different activation and deactivation conditions of the urgent signal UGNT. In other words, a falling urgent level UGLF corresponding to the deactivation condition of the urgent signal UGNT may be set lower than a rising urgent level UGLR corresponding to the activation condition of the urgent signal UGNT.

The control block 540 in FIG. 18 may activate the urgent signal UGNT at the timing point t1 when the credit value CRD becomes greater than the rising urgent level UGLR. The control block 540 does not deactivate the urgent signal UGNT at the timing point t2 when the credit value decreases back to the rising urgent level UGLR and deactivates the urgent signal UGNT at the timing point t3 when the credit value CRD becomes smaller than the falling urgent level UGLF. According to such a hysteresis scheme, excessively frequent mode changes may be alleviated and the realtime master device 103 may exit from the urgent state stably.

Figure 21:
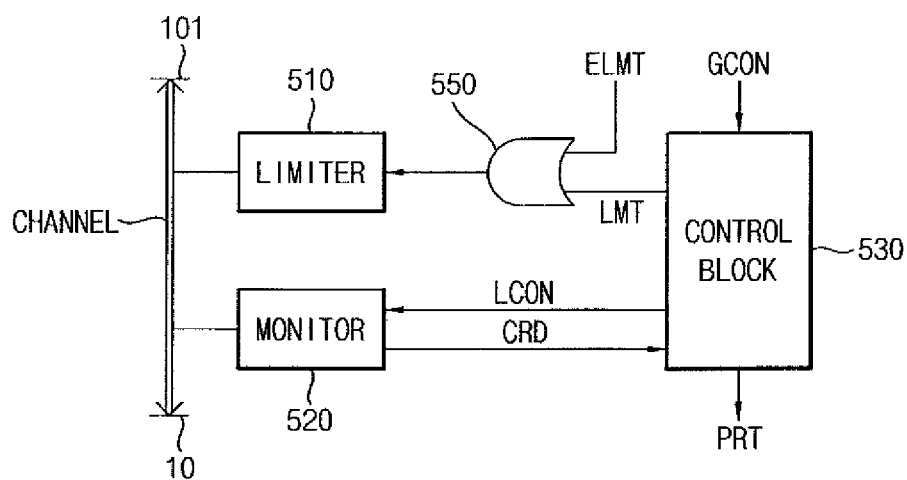
FIG. 21 is a block diagram illustrating an exemplary service controller in the system of FIG. 17.

FIG. 21 is a block diagram illustrating an exemplary service controller in the system of FIG. 17.

The service controller 501 in FIG. 21 may be one for controlling the request flow from the best effort master device 101 such as a processor. The service controller 501 in FIG. 21 is similar to the service controller 500a in FIG. 3 except the enable condition of the limiter 510.

The limiter 510 in FIG. 21 may be enabled in response to an external limit signal ELMT in addition to the above-described limit signal LMT from the control block 530. For this, the service controller 501 may further include an OR logic gate 550. The OR logic gate 550 generates an output signal by performing an OR logic operation on the limit signal LMT and the external limit signal ELMT, and the limiter 510 may be enabled in response to the output signal of the OR logic gate 550. The limit signal LMT may be activated when the corresponding best effort master device 101 is in an idle state, and the external limit signal ELMT may be activated when the other master device 103 and/or the slave device 302 are in an active state. As a result, the service controller 501 corresponding to the best effort master device 101 may block the request flow from the best effort master device 101 depending on the internal and external operational environment changes.

Figure 22:
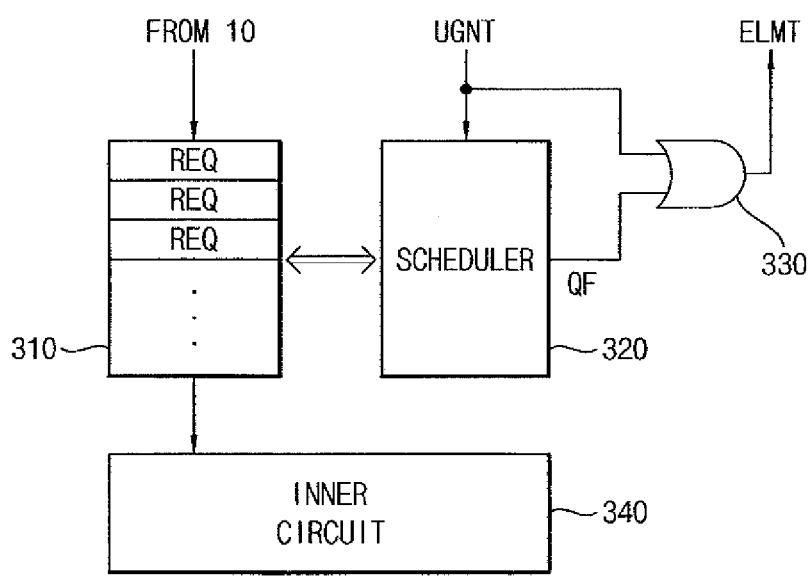
FIG. 22 is a block diagram illustrating an exemplary slave device in the system of FIG. 17.

FIG. 22 is a block diagram illustrating an exemplary slave device in the system of FIG. 17.

Referring to FIG. 22, the slave device 302 may include a request queue 310 and a scheduler 320 for controlling the request flows in the system 1000a of FIG. 17.

The request queue may store the requests transferred from the master devices 101, 102 and 103 via the interconnect device 10. When the system 1000a adopts a protocol supporting multiple outstanding transactions or multiple outstanding requests, the slave device 302 may include at least one request queue or a register circuit. The request queue 310 may store requests that are issued but not serviced.

The scheduler 320 may adjust a service order with respect to the stored requests based on priorities of the stored request. According to the determined service order, the stored requests are transferred sequentially to an inner circuit 340.

The scheduler 320 may increase the priority of the stored requests from the realtime master device 103 based on the urgent signal UGNT that is generated by the service controller 503 corresponding to the realtime master device 103. By increasing the priority, the service for the realtime master device 103 may be promoted and thus the realtime master device 103 may exit from the urgent state.

The scheduler 320 may activate a queue full signal QF when the number of the stored requests waiting for services in the request queue 310 is greater than a threshold number. An OR logic gate 330 may perform an OR logic operation on the urgent signal UGNT and the queue full signal QF to generate the external limit signal ELMT.

As described above, the urgent signal UGNT may indicate that the realtime master device 103 is in the urgent state and the external limit signal ELMT may be used to block the request from the best effort master device 101. Using the urgent signal UGNT and the external limit signal ELMT, the request flow from the realtime master device 103 may be promoted and the request flow from the best effort master device 101 may be demoted.

Figure 23:
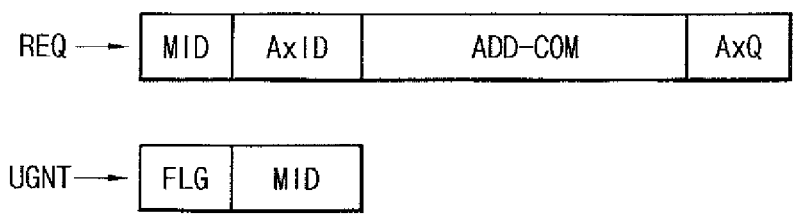
FIG. 23 is a diagram illustrating an exemplary structure of a request stored in the slave device of FIG. 22 and an exemplary structure of an urgent signal provided to the slave device.

FIG. 23 is a diagram illustrating an exemplary structure of a request stored in the slave device of FIG. 22 and an exemplary structure of an urgent signal provided to the slave device.

Referring to FIG. 23, the respective request REQ stored in the request queue 310 in the slave device 302 may include a master identifier MID indicating the master device that issued the request REQ, a request identifier AxID for distinguishing the request REQ from the other requests from the same master device, an address-command ADD-COM representing the contents of the request REQ, and a priority AxQ of the request REQ.

The urgent signal UGNT may include a flag value FLG indicating whether the master device is in the urgent state and the master identifier MID indicating the master device that generated the urgent signal UGNT. In an exemplary embodiment, the urgent signal UGNT may include the flag value FLG alone and the master identifier MID indicating the urgent master device may be provided as a signal distinct from the urgent signal UGNT.

When the flag value FLG indicates the urgent state of the master device, the scheduler 320 in FIG. 22 may compare the master identifier MID in the urgent signal UGNT and the master identifier MID in the stored requests to increase the priority of the stored requests that include the same master identifier MID as that of the urgent signal UGNT. The service for the urgent master device may be promoted to help the urgent master exit from the urgent state.

Figure 24:
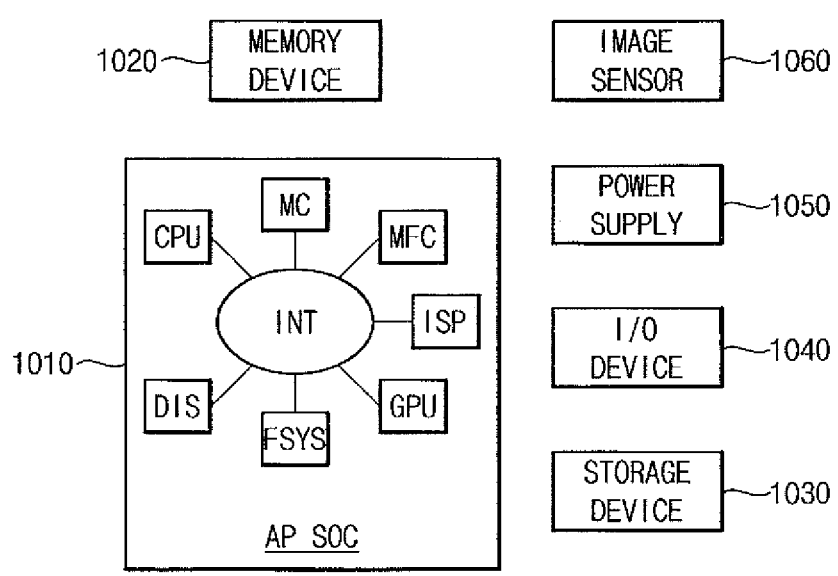
FIG. 24 is a block diagram illustrating a computing system including a system on chip according to an exemplary embodiment of the inventive concept.

FIG. 24 is a block diagram illustrating a computing system including a system on chip according to an exemplary embodiment of the inventive concept.

Referring to FIG. 24, a computing system 2000 includes a system on chip (SOC) 1010, a memory device 1020, a storage device 1030, an input/output (I/O) device 1040, a power supply 1050 and an image sensor 1060. Although not illustrated in FIG. 24, the computing system 2000 may further include ports that communicate with a video card, a sound card, a memory card, a USB device, or other electronic devices.

The SOC 1010 may be an application processor (AP) SOC including an interconnect device INT and a plurality of intellectual properties coupled to the interconnect device INT as described with reference to FIGS. 1 through 23. As illustrated in FIG. 24, the intellectual properties may include a memory controller MC, a central processing unit CPU, a display controller DIS, a file system block FSYS, a graphic processing unit GPU, an image signal processor ISP, a multi-format codec block MFC, etc. For example, the memory controller MC may correspond to the above-described slave device and other intellectual properties may correspond to the above-described master devices that use the memory controller MC as a common resource. Although not illustrated in FIG. 24, the SOC 1010 may include the above-described service controllers to control request flows from the master devices adaptively depending on an operational environment change of the SOC 1010.

The SOC 1010 may communicate with the memory device 1020, the storage device 1030, the input/output device 1040 and the image sensor 1060 via a bus such as an address bus, a control bus, and/or a data bus. In at least one exemplary embodiment, the SOC 1010 is coupled to an extended bus, such as a peripheral component interconnection (PCI) bus.

The memory device 1020 may store data for operating the computing system 2000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 1030 may include a solid state drive (SSD), a hard disk drive (HDD), a CD-ROM, etc. The input/output device 1040 may include an input device (e.g., a keyboard, a keypad, a mouse, etc.) and an output device (e.g., a printer, a display device, etc.). The power supply 1050 supplies operation voltages for the computing system 2000.

The image sensor 1060 may communicate with the SOC 1010 via the buses or other communication links. As described above, the image sensor 1060 may be integrated with the SOC 1010 in one chip, or the image sensor 1060 and the SOC 1010 may be implemented as separate chips.

The components in the computing system 2000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The computing system 2000 may be any computing system including at least one SOC. For example, the computing system 2000 may include a digital camera, a mobile phone, a smart phone, a portable multimedia player (PMP), a personal digital assistant (PDA), a tablet computer, etc.

FIG. 25 is a block diagram illustrating an interface employable in the computing system of FIG. 24 according to an exemplary embodiment of the inventive concept.

Referring to FIG. 25, a computing system 1100 may be implemented by a data processing device that uses or supports a mobile industry processor interface (MIPI) interface. The computing system 1100 may include an SOC 1110 in a form of an application processor (AP), an image sensor 1140, a display device 1150, etc. The SOC 1110 may include an interconnect device and service controllers as described above according to exemplary embodiments.

A CSI host 1112 of the SOC 1110 may perform a serial communication with a CSI device 1141 of the image sensor 1140 via a camera serial interface (CSI). In an exemplary embodiment, the CSI host 1112 may include a deserializer (DES), and the CSI device 1141 may include a serializer (SER). A DSI host 1111 of the SOC 1110 may perform a serial communication with a DSI device 1151 of the display device 1150 via a display serial interface (DSI).

In an exemplary embodiment, the DSI host 1111 may include a serializer (SER), and the DSI device 1151 may include a deserializer (DES). The computing system 1100 may further include a radio frequency (RF) chip 1160 performing a communication with the SOC 1110. A physical layer (PHY) 1113 of the computing system 1100 and a physical layer (PHY) 1161 of the RF chip 1160 may perform data communications based on a MIPI DigRF protocol. The SOC 1110 may further include a DigRF MASTER 1114 that controls the data communications of the physical layer PHY 1161.

The computing system 1100 may further include a global positioning system (GPS) 1120, storage 1170, a microphone MIC 1180, a DRAM device 1185, and a speaker 1190. In addition, the computing system 1100 may perform communications using an ultra wideband (UWB) 1210, a wireless local area network (WLAN) 1220, a worldwide interoperability for microwave access (WIMAX) 1230, etc. However, the structure and the interface of the system 1100 are not limited thereto. For example, one or more of the illustrated components of the computing system 1100 may be omitted or additional elements may be added.

A system and method of controlling a system according to at least one exemplary embodiment of the inventive concept may be efficiently used in connecting the master devices to the slave device that is commonly accessed by the master devices. At least one of the exemplary embodiments may be applied to a SOC in which various semiconductor components are integrated as one chip. According to at least exemplary embodiment of the inventive concept, request flows may be controlled efficiently in systems such as a digital camera, a mobile phone, a PDA, PMP, a smart phone, table computer, etc. requiring a smaller size, a higher performance and a higher operational speed.

The foregoing is illustrative of exemplary embodiments and is not to be construed as limiting thereof. Although exemplary embodiments have been described, many modifications can be made in the exemplary embodiments without departing from the present inventive concept. Accordingly, all such modifications are intended to be included within the scope of the present inventive concept.

What is claimed is:

1. A system on chip (SOC) comprising:
a slave device;
a plurality of master devices configured to generate requests to demand services from the slave device;
a single interconnect device directly connected to the slave device through a first channel and the master devices through respective second channels, the interconnect device configured to perform an arbitrating operation on the requests;
a plurality of service controllers configured to control a flow of the requests through the second channels from the master devices to the slave device adaptively using a global control signal indicating an operational environment change of the SOC; and
a global controller configured to generate the global control signal based on at least one state signal comprising a first state signal from the slave device and a second state signal from one of the master devices,
wherein the global controller is configured to receive the first state signal of the at least one state signal from the slave device and the second state signal of the at least one state signal from the one master device,
wherein a first master device among the master devices activates a valid signal when the first master device transfers a first request among the requests to the single interconnect device,
wherein one of the service controllers deactivates the valid signal and transfers the deactivated valid signal to the single interconnect device to prevent the first request from being serviced, when the indicated operational environment change is abnormal.

2. The SOC of claim 1, wherein the slave device includes a memory controller and the master devices include a modem and a display controller, and wherein the at least one state signal includes at least one of:
the first state signal that is activated when an operational temperature of the memory controller becomes greater than a threshold temperature;
a third state signal that is activated when the modem is not serviced by the slave device for a threshold time; and
a fourth state signal that is activated when a data buffer rate of the display controller is lower than a threshold rate, where the second state signal is either the third or the fourth state signal.

3. The SOC of claim 1, wherein each of the service controllers includes:
a monitor configured to generate a credit value by detecting a service requirement level of the corresponding master device in realtime; and
a control block configured to generate a local control signal to control the monitor based on the operational environment change and configured to generate a priority information signal for the request from the corresponding master device based on the credit value.

4. The SOC of claim 3,
wherein the local control signal includes an overflow value, a unit increment value and a unit decrement value, and
wherein the monitor includes:
a first counter configured to generate a first event signal that is activated with a period corresponding to the overflow value;
a service detector configured to generate a second event signal based on channel signals transferred between the corresponding master device and the interconnect device, the second event signal being activated when the corresponding master device is serviced by the slave device; and
a second counter configured to increase the credit value by the unit increment value in response to each activation of the first event signal and configured to decrease the credit value by the unit decrement value in response to each activation of the second event signal.

5. The SOC of claim 4, wherein the control block is configured to change at least one of the overflow value, the unit increment value and the unit decrement value based on the operational environment change to control the flow of requests from the corresponding master device.

6. The SOC of claim 5, wherein the control block is configured to promote the request flow of the corresponding master device by decreasing the overflow value, increasing the unit increment value or decreasing the unit decrement value, and configured to demote the flow of requests from the corresponding master device by increasing the overflow value, decreasing the unit increment value or increasing the unit decrement value.

7. The SOC of claim 4, wherein the local control signal further includes a steal value that is provided when the operational environment change occurs, and second counter decreases the credit value by the steal value.

8. The SOC of claim 3, wherein at least one of the service controllers includes: a limiter configured to block the flow of requests from the corresponding master device in response to a limit signal from the control block.

9. The SOC of claim 8, wherein the control block is configured to activate the limit signal when the credit value is smaller than a grant value, and configured to change the grant value based on the operational environment change to control the flow of requests from the corresponding master device.

10. The SOC of claim 8, wherein the limiter includes:
a synchronizer configured to generate a synchronized limit signal based on the limit signal;
a first logic gate configured to output a masked valid signal by performing a logic operation on the synchronized limit signal and a valid signal from the corresponding master device; and
a second logic gate configured to output a masked ready signal by performing a logic operation on the synchronized limit signal and a ready signal from the interconnect device.

11. The SOC of claim 3, wherein the control block is configured to set a plurality of operation modes by dividing ranges of the credit value and configured to change values of the local control signal based on the operation modes to control the flow of requests from the corresponding master device.

12. The SOC of claim 11, wherein the operation modes include:
a promotion mode corresponding to the credit value greater than a upper boundary value;
a default mode corresponding to the credit value smaller than the upper boundary value and greater than a lower boundary value; and
a demotion mode corresponding to the credit value smaller than the lower boundary value.

13. The SOC of claim 12, wherein the control block is configured to change the values of the local control signal based on the operation modes such that the corresponding master device is allowed to have a larger bandwidth in the promotion mode than the default mode and a larger bandwidth in the default mode than the demotion mode.

14. The SOC of claim 1, wherein the slave device includes:
a request queue configured to store the requests transferred from the master devices via the interconnect device; and a scheduler configured to adjust a service order with respect to the stored requests based on priorities of the stored request.

15. The SOC of claim 14, wherein the master devices include at least one realtime master device, and the service controller corresponding to the reaffirm master device is configured to generate an urgent signal indicating that the realtime master device requires an urgent service from the slave device.

16. The SOC of claim 15, wherein the scheduler is configured to increase the priority of the stored requests from the realtime master device based on the urgent signal.

17. The SOC of claim 15, further comprising a transmission line that is point-to-point coupled between the slave device and the service controller corresponding to the realtime master device, wherein the urgent signal is transferred via the signal line directly from the service controller corresponding to the realtime master device to the slave device.

18. The SOC of claim 14, wherein the master devices include at least one best effort master device, the slave device is configured to generate an external limit signal based on the operational environment change, and the service controller corresponding to the best effort master device is configured to block the flow of the request from the best effort master device in response to the external limit signal.

19. The SOC of claim 18, wherein the slave device is configured to activate the external limit signal when the number of the stored requests in the request queue is greater than a threshold number.

20. The SOC of claim 18, wherein the master devices further include at least one realtime master device, and the slave device is configured to activate the external limit signal in response to an urgent signal indicating that the realtime master device requires an urgent service from the slave device.

21. The SOC of claim 20, wherein the realtime master device includes a display controller and the best effort master device includes a processor.

22. The SOC of claim 18, further comprising a transmission line that is point-to-point coupled between the slave device and the service controller corresponding to the best effort device, wherein the external limit signal is transferred via the signal line directly from the slave device to the service controller corresponding to the best effort master device.

23. A method of controlling a system on chip (SOC) including at least one slave device, a plurality of master devices configured to generate requests to demand services from the slave device, respectively, a plurality of service controllers, a global controller, and a single interconnect device directly connected to the slave device through a first channel and the master devices through respective second channels, the method comprising:
generating, by the slave device a first state signal indicating an operational state of the slave device;
generating, by a first master device among the master devices a second state signal indicating an operational state of the first master device;
generating, by the global controller, a global control signal based on the first state signal received from the slave device and the second state signal received from the first master device, the global control signal indicating an operational environment change of the SOC; and controlling, by the service controllers, a flow of requests through the second channels from the master devices to the slave device adaptively depending on the global control signal, wherein the first master device activates a valid signal when the first master device transfers a first request among the requests to the single interconnect device, and wherein one of the service controllers deactivates the valid signal and transfers the deactivated valid signal to the single interconnect device to prevent the first request from being serviced when the indicated operational environment change is abnormal.

* * * * *